US012544098B2

(12) United States Patent
Pernatiy et al.

(10) Patent No.: US 12,544,098 B2
(45) Date of Patent: Feb. 10, 2026

(54) MEDICAL DEVICE WITH BLADE ASSEMBLY

(71) Applicant: Boston Scientific Scimed, Inc., Maple Grove, MN (US)

(72) Inventors: Olena Pernatiy, Galway (IE); Anthony Malone, Galway (IE); Javier Palomar-Moreno, Galway (IE)

(73) Assignee: BOSTON SCIENTIFIC SCIMED, INC., Maple Grove, MN (US)

( * ) Notice: Subject to any disclaimer, the term of this patent is extended or adjusted under 35 U.S.C. 154(b) by 73 days.

(21) Appl. No.: 18/677,293

(22) Filed: May 29, 2024

(65) Prior Publication Data

US 2024/0398439 A1    Dec. 5, 2024

Related U.S. Application Data

(60) Provisional application No. 63/469,580, filed on May 30, 2023.

(51) Int. Cl.
*A61B 17/3207* (2006.01)
*A61B 17/00* (2006.01)
*A61B 17/32* (2006.01)

(52) U.S. Cl.
CPC ........ *A61B 17/320725* (2013.01); *A61B 2017/00862* (2013.01); *A61B 2017/00867* (2013.01);
(Continued)

(58) Field of Classification Search
CPC .. A61B 17/320725; A61B 2017/00862; A61B 2017/00867; A61B 2017/00893;
(Continued)

(56) References Cited

U.S. PATENT DOCUMENTS 3,540,431 A    11/1970   Mobin-Uddin
3,837,345 A     9/1974   Matar
(Continued)

FOREIGN PATENT DOCUMENTS

DE    3402573 A1    8/1985
EP    1453414 A2    6/2003
(Continued)

OTHER PUBLICATIONS

International Search Report and Written Opinion for Inernational Application No. PCT/US2024/031441, dated Oct. 17, 2024.
(Continued)

*Primary Examiner* — Jocelin C Tanner

(74) *Attorney, Agent, or Firm* — Seager Tufte & Wickhem, LLP

(57) ABSTRACT

A medical device may include an inflatable balloon secured to a distal region of a catheter shaft. A blade assembly may extend over and be secured to the inflatable balloon. The blade assembly may include a plurality of blades and at least two rings that are adapted to secure each of the plurality of blades. Each of the rings include an inner surface adapted to be secured to the inflatable balloon and an outer surface. A number of living hinges are formed within the inner surface and the outer surface that cooperate to allow the blade assembly to move between an expanded configuration and a collapsed configuration.

20 Claims, 20 Drawing Sheets

(52) U.S. Cl.
CPC .............. *A61B 2017/00893* (2013.01); *A61B 2017/32006* (2013.01)

(58) Field of Classification Search
CPC .... A61B 2017/32006; A61M 25/1002; A61M 25/104; A61M 29/02; A61M 2025/1004; A61M 2025/1086; A61M 2025/109
USPC ........................................................ 606/159
See application file for complete search history.

(56) References Cited

U.S. PATENT DOCUMENTS

| | | |
|---|---|---|
| 3,952,747 A | 4/1976 | Kimmel, Jr. |
| 4,273,128 A | 6/1981 | Lary |
| 4,425,908 A | 1/1984 | Simon |
| 4,494,531 A | 1/1985 | Gianturco |
| 4,619,246 A | 10/1986 | Molgaard-Nielsen et al. |
| 4,643,184 A | 2/1987 | Mobin-Uddin |
| 4,650,466 A | 3/1987 | Luther |
| 4,696,667 A | 9/1987 | Masch |
| 4,723,549 A | 2/1988 | Wholey et al. |
| 4,728,319 A | 3/1988 | Masch |
| 4,765,332 A | 8/1988 | Fischell et al. |
| 4,787,388 A | 11/1988 | Hofmann |
| 4,817,600 A | 4/1989 | Herms et al. |
| 4,832,055 A | 5/1989 | Palestrant |
| 4,832,691 A | 5/1989 | Witzel |
| 4,840,176 A | 6/1989 | Ohno |
| 4,856,516 A | 8/1989 | Hillstead |
| 4,921,484 A | 5/1990 | Hillstead |
| 4,990,156 A | 2/1991 | Lefebvre |
| 4,998,539 A | 3/1991 | Delsanti |
| 5,009,659 A | 4/1991 | Hamlin et al. |
| 5,030,201 A | 7/1991 | Palestrant |
| 5,035,706 A | 7/1991 | Giantureo et al. |
| 5,047,040 A | 9/1991 | Simpson et al. |
| 5,069,679 A | 12/1991 | Taheri |
| 5,078,722 A | 1/1992 | Stevens |
| 5,152,773 A | 10/1992 | Redha |
| 5,176,693 A | 1/1993 | Pannek, Jr. |
| 5,190,058 A | 3/1993 | Jones et al. |
| 5,192,291 A | 3/1993 | Pannek, Jr. |
| 5,196,024 A | 3/1993 | Barath |
| 5,209,749 A | 5/1993 | Buelna |
| 5,217,484 A | 6/1993 | Marks |
| 5,224,945 A | 7/1993 | Pannek, Jr. |
| 5,226,909 A | 7/1993 | Evans et al. |
| 5,250,059 A | 10/1993 | Andreas et al. |
| 5,282,813 A | 2/1994 | Redha |
| 5,287,858 A | 2/1994 | Hammerslag et al. |
| 5,320,634 A | 6/1994 | Vigil et al. |
| 5,324,304 A | 6/1994 | Rasmussen |
| 5,329,942 A | 7/1994 | Gunther et al. |
| 5,336,234 A | 8/1994 | Vigil et al. |
| 5,354,279 A | 10/1994 | Hoefling |
| 5,370,657 A | 12/1994 | Irie |
| 5,372,601 A | 12/1994 | Lary |
| 5,375,612 A | 12/1994 | Cottonceau et al. |
| 5,383,887 A | 1/1995 | Nadal |
| 5,417,703 A | 5/1995 | Brown et al. |
| 5,441,510 A | 8/1995 | Simpson et al. |
| 5,456,667 A | 10/1995 | Ham et al. |
| 5,484,449 A | 1/1996 | Amundson et al. |
| 5,507,760 A | 4/1996 | Wynne et al. |
| 5,507,761 A | 4/1996 | Duer |
| 5,522,825 A | 6/1996 | Kropf et al. |
| 5,527,282 A | 6/1996 | Segal |
| 5,556,405 A | 9/1996 | Lary |
| 5,569,277 A | 10/1996 | Evans et al. |
| 5,591,198 A | 1/1997 | Boyle et al. |
| 5,601,595 A | 2/1997 | Smith |
| 5,616,149 A | 4/1997 | Barath |
| 5,620,457 A | 4/1997 | Pinchasik et al. |
| 5,628,746 A | 5/1997 | Clayman |
| 5,628,761 A | 5/1997 | Rizik |
| 5,634,942 A | 6/1997 | Chevillon et al. |
| 5,643,296 A | 7/1997 | Hundertmark et al. |
| 5,643,312 A | 7/1997 | Fischell et al. |
| 5,649,941 A | 7/1997 | Lary |
| 5,649,953 A | 7/1997 | Lefebvre |
| 5,697,944 A | 12/1997 | Lary |
| 5,709,704 A | 1/1998 | Nott et al. |
| 5,713,913 A | 2/1998 | Lary et al. |
| 5,725,543 A | 3/1998 | Redha |
| 5,730,698 A | 3/1998 | Fischell et al. |
| 5,772,681 A | 6/1998 | Leoni |
| 5,792,158 A | 8/1998 | Lary |
| 5,797,935 A * | 8/1998 | Barath ............ A61B 17/320725 606/159 |
| 5,810,874 A | 9/1998 | Lefebrve |
| 5,836,968 A | 11/1998 | Simon et al. |
| 5,836,969 A | 11/1998 | Kim et al. |
| 5,843,103 A | 12/1998 | Wulfman |
| 5,853,420 A | 12/1998 | Chevillon et al. |
| 5,879,370 A | 3/1999 | Fischell et al. |
| 5,895,402 A | 4/1999 | Hundertmark et al. |
| 5,902,313 A | 5/1999 | Redha |
| 5,947,985 A | 9/1999 | Imran |
| 5,954,740 A | 9/1999 | Ravenscroft et al. |
| 5,968,071 A | 10/1999 | Chevillo et al. |
| 5,976,172 A | 11/1999 | Homsma et al. |
| 6,009,877 A | 1/2000 | Edwards |
| 6,013,093 A | 1/2000 | Nott et al. |
| 6,036,689 A | 3/2000 | Tu et al. |
| 6,086,604 A | 7/2000 | Fischell et al. |
| 6,102,938 A | 8/2000 | Evans et al. |
| 6,156,254 A | 12/2000 | Andrews et al. |
| 6,165,187 A | 12/2000 | Reger |
| 6,238,412 B1 | 5/2001 | Dubrul et al. |
| 6,241,746 B1 | 6/2001 | Bosma et al. |
| 6,245,040 B1 | 6/2001 | Inderbitzen et al. |
| 6,258,108 B1 | 7/2001 | Lary |
| 6,267,776 B1 | 7/2001 | O'Connell |
| 6,331,166 B1 | 12/2001 | Burbank et al. |
| 6,423,032 B2 | 7/2002 | Parodi |
| 6,450,988 B1 | 9/2002 | Bradshaw |
| 6,451,036 B1 | 9/2002 | Heitzmann et al. |
| 6,500,186 B2 | 12/2002 | Lafontaine et al. |
| 6,508,773 B2 | 1/2003 | Burbank et al. |
| 6,547,803 B2 | 4/2003 | Seward et al. |
| 6,547,817 B1 | 4/2003 | Fischell et al. |
| 6,562,062 B2 | 5/2003 | Jenusaitis et al. |
| 6,605,107 B1 | 8/2003 | Klein |
| 6,632,231 B2 | 10/2003 | Radisch, Jr. |
| 6,709,444 B1 | 3/2004 | Makower |
| 6,716,240 B2 | 4/2004 | Fischell et al. |
| 6,746,463 B1 | 6/2004 | Schwartz |
| 6,808,531 B2 | 10/2004 | Lafontaine et al. |
| 6,942,680 B2 | 9/2005 | Grayzel et al. |
| 6,951,566 B2 | 10/2005 | Lary |
| 7,004,963 B2 | 2/2006 | Wang et al. |
| 7,011,670 B2 | 3/2006 | Radisch, Jr. |
| 7,022,104 B2 | 4/2006 | Konstantino |
| 7,029,483 B2 | 4/2006 | Schwartz |
| 7,070,576 B2 | 7/2006 | O'Brien |
| 7,131,981 B2 | 11/2006 | Appling et al. |
| 7,153,315 B2 | 12/2006 | Miller |
| 7,172,609 B2 | 2/2007 | Radisch, Jr. |
| 7,186,237 B2 | 3/2007 | Meyer et al. |
| 7,201,761 B2 | 4/2007 | Woolfson et al. |
| 7,252,650 B1 | 8/2007 | Andrews et al. |
| 7,252,679 B2 | 8/2007 | Fischell et al. |
| 7,270,673 B2 | 9/2007 | Yee et al. |
| 7,279,002 B2 | 10/2007 | Shaw et al. |
| 7,291,158 B2 | 11/2007 | Crow et al. |
| 7,303,572 B2 | 12/2007 | Melsheimer et al. |
| 7,338,463 B2 | 3/2008 | Vigil |
| 7,396,358 B2 | 7/2008 | Appling et al. |
| 7,413,558 B2 | 8/2008 | Kelley et al. |
| 7,494,497 B2 | 2/2009 | Weber |
| 7,513,886 B2 | 4/2009 | Konstantino |
| 7,517,352 B2 | 4/2009 | Evans et al. |
| 7,547,321 B2 | 6/2009 | Silvestri et al. |
| 7,566,319 B2 | 7/2009 | McAuley et al. |

(56) References Cited

U.S. PATENT DOCUMENTS

| | | |
|---|---|---|
| 7,632,288 B2 | 12/2009 | Wu |
| 7,658,744 B2 | 2/2010 | Jackson |
| 7,662,163 B2 | 2/2010 | Grayzel et al. |
| 7,691,116 B2 | 4/2010 | Goodin et al. |
| 7,691,119 B2 | 4/2010 | Farnan |
| 7,753,907 B2 | 7/2010 | DiMatteo et al. |
| 7,754,047 B2 | 7/2010 | Kelley |
| 7,758,604 B2 | 7/2010 | Wu et al. |
| 7,799,043 B2 | 9/2010 | O''Brien et al. |
| 7,868,824 B2 | 1/2011 | Sumi |
| 7,879,053 B2 | 2/2011 | Trinidad |
| 7,883,537 B2 | 2/2011 | Grayzel et al. |
| 7,931,663 B2 | 4/2011 | Farnan et al. |
| 7,955,350 B2 | 6/2011 | Konstantino |
| 7,993,302 B2 | 8/2011 | Hebert et al. |
| 7,993,358 B2 | 8/2011 | O'Brien |
| 8,038,691 B2 | 10/2011 | Bence et al. |
| 8,043,311 B2 | 10/2011 | Radisch, Jr. et al. |
| 8,048,093 B2 | 11/2011 | Mapes et al. |
| 8,052,703 B2 | 11/2011 | St. Martin et al. |
| 8,066,726 B2 | 11/2011 | Kelley |
| 8,080,026 B2 | 12/2011 | Konstantino et al. |
| 8,123,770 B2 | 2/2012 | Olsen et al. |
| 8,157,856 B2 | 4/2012 | Fischell et al. |
| 8,172,864 B2 | 5/2012 | Wu |
| 8,211,354 B2 | 7/2012 | Burton |
| 8,323,243 B2 | 12/2012 | Schneider et al. |
| 8,323,307 B2 | 12/2012 | Hardert |
| 8,348,987 B2 | 1/2013 | Eaton |
| 8,361,096 B2 | 1/2013 | Bence et al. |
| 8,454,636 B2 | 6/2013 | Konstantino et al. |
| 8,454,637 B2 | 6/2013 | Aggerholm et al. |
| 8,491,615 B2 | 7/2013 | Manderfeld et al. |
| 8,523,887 B2 | 9/2013 | Grayzel et al. |
| 8,529,596 B2 | 9/2013 | Grandfield et al. |
| 8,690,903 B2 | 4/2014 | Bence et al. |
| 8,870,816 B2 | 10/2014 | Chambers et al. |
| 9,072,812 B2 | 7/2015 | Speck et al. |
| 9,078,951 B2 | 7/2015 | Speck et al. |
| 9,095,688 B2 | 8/2015 | Burton |
| 9,101,684 B2 | 8/2015 | Speck et al. |
| 9,119,944 B2 | 9/2015 | Chambers et al. |
| 9,179,936 B2 | 11/2015 | Feld et al. |
| 9,199,066 B2 | 12/2015 | Konstantino et al. |
| 9,211,394 B2 | 12/2015 | Leffel |
| 9,216,033 B2 | 12/2015 | Feld et al. |
| 9,226,768 B2 | 1/2016 | Gunderson et al. |
| 9,302,071 B2 | 4/2016 | Manderfeld et al. |
| 9,351,756 B2 | 5/2016 | Gershony et al. |
| 9,364,255 B2 | 6/2016 | Weber |
| 9,375,328 B2 | 6/2016 | Farnan |
| 9,603,619 B2 | 3/2017 | Bence et al. |
| 9,604,036 B2 | 3/2017 | Burton et al. |
| 9,763,691 B2 | 9/2017 | Spencer et al. |
| 10,086,176 B2 | 10/2018 | Sampoganaro et al. |
| 10,166,374 B2 | 1/2019 | Giasolli et al. |
| 10,881,426 B2 | 1/2021 | Bacino et al. |
| 11,154,320 B2 | 10/2021 | Haverkost et al. |
| 11,491,314 B2 | 11/2022 | Giasolli et al. |
| 2003/0042186 A1 | 3/2003 | Boyle |
| 2003/0144683 A1 | 7/2003 | Sirhan et al. |
| 2003/0163148 A1 | 8/2003 | Wang et al. |
| 2003/0225370 A1 | 12/2003 | Mueller |
| 2004/0034384 A1 | 2/2004 | Fukaya |
| 2004/0111108 A1 | 6/2004 | Farnan |
| 2004/0127920 A1 | 7/2004 | Radisch, Jr. |
| 2004/0143287 A1 | 7/2004 | Konstantino et al. |
| 2004/0204738 A1 | 10/2004 | Weber et al. |
| 2004/0243158 A1 | 12/2004 | Konstantino et al. |
| 2005/0021070 A1 | 1/2005 | Feld et al. |
| 2005/0021071 A1 | 1/2005 | Konstantino et al. |
| 2005/0049677 A1 | 3/2005 | Farnan |
| 2005/0070888 A1 | 3/2005 | Dimatteo et al. |
| 2005/0119678 A1 | 6/2005 | O'Brien et al. |
| 2005/0124939 A1 | 6/2005 | Konstantino |
| 2005/0137615 A1 | 6/2005 | Mapes et al. |
| 2005/0149102 A1 | 7/2005 | Radisch, Jr. et al. |
| 2005/0177130 A1 | 8/2005 | Konstantino et al. |
| 2005/0209674 A1 | 9/2005 | Kutscher et al. |
| 2005/0240148 A1 | 10/2005 | Cheves et al. |
| 2005/0288629 A1 | 12/2005 | Kunis |
| 2006/0085025 A1 | 4/2006 | Farnan et al. |
| 2006/0085026 A1 | 4/2006 | Appling et al. |
| 2006/0106143 A1 | 5/2006 | Lin et al. |
| 2006/0106412 A1 | 5/2006 | Crow et al. |
| 2006/0106413 A1 | 5/2006 | Bence et al. |
| 2006/0111736 A1 | 5/2006 | Kelley |
| 2006/0116700 A1 | 6/2006 | Crow |
| 2006/0116701 A1 | 6/2006 | Crow |
| 2006/0129093 A1 | 6/2006 | Jackson |
| 2006/0135980 A1 | 6/2006 | Trinidad |
| 2006/0178685 A1 | 8/2006 | Melsheimer |
| 2006/0182873 A1 | 8/2006 | Klisch et al. |
| 2006/0247674 A1 | 11/2006 | Roman |
| 2006/0259005 A1 | 11/2006 | Konstantino et al. |
| 2006/0259062 A1 | 11/2006 | Konstantino |
| 2007/0016232 A1 | 1/2007 | St. Martin et al. |
| 2007/0060863 A1 | 3/2007 | Goeken et al. |
| 2007/0213752 A1 | 9/2007 | Hack |
| 2008/0077164 A1 | 3/2008 | Murphy |
| 2008/0306499 A1 | 12/2008 | Katoh et al. |
| 2009/0099581 A1 | 4/2009 | Kim et al. |
| 2009/0105687 A1 | 4/2009 | Deckman et al. |
| 2009/0171283 A1 | 7/2009 | Schaffer et al. |
| 2009/0171284 A1 | 7/2009 | Burke et al. |
| 2010/0042121 A1 | 2/2010 | Schneider et al. |
| 2010/0121372 A1 | 5/2010 | Farnan |
| 2010/0241148 A1 | 9/2010 | Schon et al. |
| 2010/0324472 A1 | 12/2010 | Wulfman |
| 2011/0125247 A1 | 5/2011 | Farnan et al. |
| 2011/0264127 A1 | 10/2011 | Mauch et al. |
| 2012/0053605 A1 | 3/2012 | Konstantino et al. |
| 2012/0059401 A1 | 3/2012 | Konstantino et al. |
| 2012/0191111 A1 | 7/2012 | Aggerholm et al. |
| 2012/0245607 A1 | 9/2012 | Gershony et al. |
| 2012/0245616 A1 | 9/2012 | Farnan |
| 2012/0316589 A1 | 12/2012 | Schaeffer |
| 2013/0023817 A1 | 1/2013 | Speck et al. |
| 2013/0041391 A1 | 2/2013 | Spencer et al. |
| 2013/0046231 A1 | 2/2013 | Speck et al. |
| 2013/0204179 A1 | 8/2013 | Konstantino et al. |
| 2013/0226071 A1 | 8/2013 | Konstantino et al. |
| 2013/0226220 A1 | 8/2013 | Konstantino et al. |
| 2013/0253554 A1 | 9/2013 | Gershony et al. |
| 2014/0378966 A1 | 12/2014 | Haverkost et al. |
| 2015/0057657 A1 | 2/2015 | Squire et al. |
| 2016/0081711 A1 | 3/2016 | Gunderson et al. |
| 2017/0080192 A1 | 3/2017 | Giasolli et al. |
| 2017/0100570 A1 | 4/2017 | Giasolli et al. |
| 2018/0000509 A1 | 1/2018 | Wilson et al. |
| 2018/0036032 A1 | 2/2018 | Spencer et al. |
| 2018/0043140 A1 | 2/2018 | Iwano et al. |
| 2018/0304052 A1 | 10/2018 | Schneider et al. |
| 2019/0307992 A1 | 10/2019 | Haverkost et al. |
| 2020/0188641 A1* | 6/2020 | Giasolli ............... B29C 65/48 |
| 2020/0315654 A1 | 10/2020 | Spinelli et al. |
| 2021/0213259 A1 | 7/2021 | Giasolli et al. |
| 2021/0251652 A1 | 8/2021 | Gunderson et al. |
| 2022/0000515 A1 | 1/2022 | Haverkost et al. |
| 2022/0054805 A1 | 2/2022 | Schulze |

FOREIGN PATENT DOCUMENTS

| | | |
|---|---|---|
| WO | 0160262 A1 | 8/2001 |
| WO | 03049603 A2 | 6/2003 |
| WO | 2012071095 A1 | 5/2012 |
| WO | 2016163495 A1 | 10/2016 |

OTHER PUBLICATIONS

International Search Report and Written Opinion dated Jun. 26, 2019 for International Application No. PCT/US2019/026327. (11 pages).

(56) References Cited

OTHER PUBLICATIONS

Song et al., "Efficacy of the Wolverine Cutting Balloon on a Cicumferential Calicified Coronary Lesion: Bench Test using a Three-Dimensional Printer and Computer Simulation with the Finite Element Method," Cardiovascular Intervention and Therapeutics, 11 pages, 2020. Accepted Nov. 23, 2020.

* cited by examiner

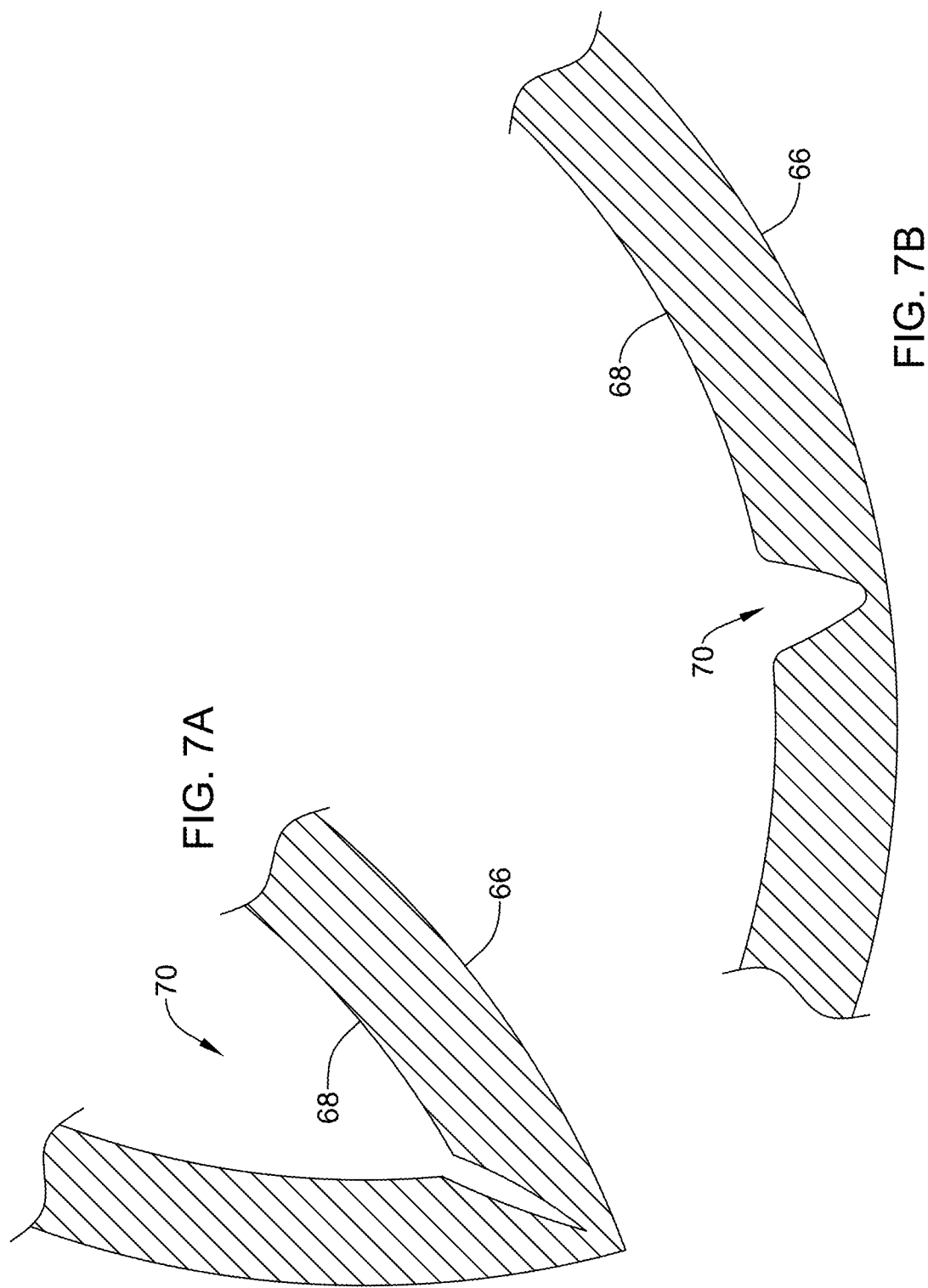

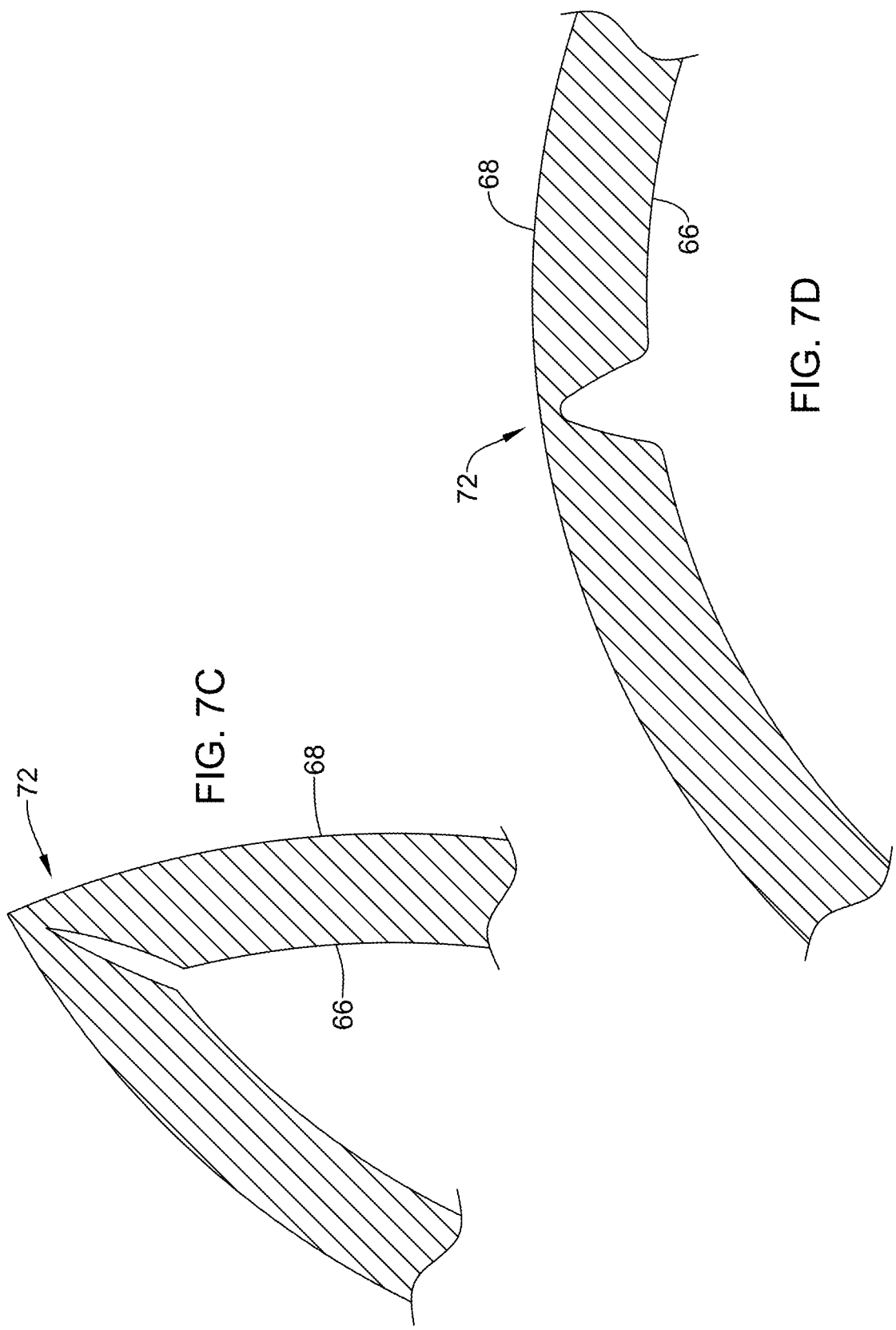

MEDICAL DEVICE WITH BLADE ASSEMBLY

CROSS-REFERENCE TO RELATED APPLICATIONS

This application claims the benefit of U.S. Provisional Patent Application Ser. No. 63/469,580, filed May 30, 2023, which is incorporated herein by reference.

TECHNICAL FIELD

The disclosure is directed to medical devices including a blade assembly. More particularly, the disclosure is directed to medical devices in which a blade assembly is securable over an inflatable balloon.

BACKGROUND

Heart and vascular disease are major problems in the United States and throughout the world. Conditions such as atherosclerosis result in blood vessels becoming blocked or narrowed. This blockage can result in lack of oxygenation of the heart, which has significant consequences since the heart muscle must be well oxygenated in order to maintain its blood pumping action, or lack of oxygenation and/or circulation to other regions of the body.

Occluded, stenotic, or narrowed blood vessels, as well as native or synthetic arteriovenous dialysis fistulae, may be treated in a recanalization procedure, such as with an angioplasty balloon catheter advanced over a guidewire to an occlusion so that the balloon is positioned across the occlusion. The balloon is then inflated to enlarge the passageway through the occlusion. The nature of the treated stenosis may vary, as the stenosis may be formed of lipidic plaque, fibrous plaque, calcified plaque and combinations thereof. Appropriate lesion preparation such as plaque scoring, disruption and modification improves the clinical outcome. If stenting is appropriate, lesion preparation facilitates crossing the lesion and minimizes potential problems with stent under-expansion.

One of the major obstacles in treating coronary artery disease and/or treating blocked blood vessels or fistulae is re-stenosis or re-narrowing of the passageway through the occlusion subsequent to an angioplasty procedure or other recanalization/revascularization procedures. Evidence has shown that cracking, cutting or scoring the stenosis, for example, with an angioplasty balloon equipped with a blade member, during treatment can reduce incidence of re-stenosis. Additionally, cracking, cutting or scoring the stenosis may reduce trauma at the treatment site and/or may reduce the trauma to adjacent healthy tissue. Blade members may also be beneficial additions to angioplasty procedures when the targeted occlusion is hardened or calcified. It is believed typical angioplasty balloons, alone, may not be able to expand certain of these hardened lesions. Thus, angioplasty balloons equipped with blade members have been developed to attempt to enhance angioplasty treatments. There is an ongoing need for improved medical devices such as angioplasty balloons having blade assemblies that may be secured relative to the angioplasty balloon.

SUMMARY

The disclosure is directed to several alternative designs, materials and methods of manufacturing medical device structures and assemblies, and the use thereof. An example may be found in a medical device that includes a catheter shaft including a distal region and an inflatable balloon secured to the distal region of the catheter shaft, the inflatable balloon including an outer surface. A blade assembly extends over and is secured to at least part of the outer surface. The blade assembly includes a plurality of blades and at least two rings adapted to secure each of the plurality of blades, each of the at least two rings moveable between an expanded configuration in which each of the at least two rings have an annular profile and a collapsed configuration in which each of the at least two rings collapse radially inwardly. Each of the at least two rings include an inner surface adapted to be secured relative to the outer surface of the inflatable balloon, an outer surface opposite the inner surface, a plurality of living hinges formed within the inner surface, and a plurality of living hinges formed within the outer surface. The plurality of living hinges formed within the inner surface and the plurality of living hinges formed within the outer surface cooperate to allow each of the plurality of blades to move radially inwardly in the collapsed configuration.

Alternatively or additionally, for each of the plurality of blades, the plurality of living hinges formed within the outer surface include a first pair of living hinges closest to that blade and a second pair of living hinges disposed adjacent and on either side of the first pair of living hinges.

Alternatively or additionally, the blade assembly may further include a plurality of elongate members extending axially between a first ring of the at least two rings and a second ring of the at least two rings, the first ring, the second ring and the plurality of elongate members forming a cage that is adapted to be secured in place over the inflatable balloon.

Alternatively or additionally, each of the plurality of blades may be attached to one of the plurality of elongate members.

Alternatively or additionally, the plurality of elongate members may define a plurality of elongate void spaces between adjacent elongate members.

Alternatively or additionally, the inflatable balloon may define one or more balloon wings when the inflatable balloon is deflated, and the one or more balloon wings may be adapted to extend through one or more of the plurality of elongate void spaces.

Alternatively or additionally, each of the at least two rings may include slots formed in the outer surface thereof to allow each of the plurality of blades to be disposed in the slots.

Alternatively or additionally, the slots formed in a first ring of the at least two rings may be radially aligned with the slots formed in a second ring of the at least two rings.

Alternatively or additionally, the plurality of blades may include more than four blades.

Alternatively or additionally, the plurality of blades may include eight blades.

Another example may be found in a medical device that includes a catheter shaft including a distal region and an inflatable balloon secured to the distal region of the catheter shaft, the inflatable balloon including an outer surface with a distal cone and a proximal cone. A blade assembly extends over and is secured to at least part of the outer surface. The blade assembly includes one or more blades and a distal ring and a proximal ring moveable between an expanded configuration and a collapsed configuration and adapted to secure each of the one or more blades. The distal ring includes an inner surface adapted to be secured relative to the outer surface of the inflatable balloon and a plurality of living hinges formed within the distal ring and adapted to extend over the distal cone in the collapsed configuration. The proximal ring includes an inner surface adapted to be secured relative to the outer surface of the inflatable balloon and a plurality of living hinges formed within the proximal ring and adapted to extend over the proximal cone in the collapsed configuration.

Alternatively or additionally, the blade assembly may further include a plurality of elongate members extending axially between a distal ring and the proximal ring, the proximal ring, the distal ring and the plurality of elongate members forming a cage that is adapted to be secured in place over the inflatable balloon.

Alternatively or additionally, the distal ring, the proximal ring, the plurality of elongate members and the plurality of blades may be formed separately or as a unitary structure of the same material.

Another example may be found in a medical device that includes a catheter shaft including a distal region and an inflatable balloon that is secured to the distal region of the catheter shaft, the inflatable balloon including an outer balloon surface. A blade assembly extends over and is secured to at least part of the outer surface, the blade assembly moveable between an expanded configuration and a collapsed configuration. The blade assembly includes a first annular band having an inner surface adapted to be secured relative to the outer balloon surface, a plurality of inner hinges formed in the inner surface, an outer surface opposite the inner surface, a plurality of outer hinges formed in the outer surface, and a channel formed in the outer surface. The blade assembly includes a second annular band having an inner surface adapted to be secured relative to the outer balloon surface, a plurality of inner hinges formed in the inner surface, an outer surface opposite the inner surface, a plurality of outer hinges formed in the outer surface, and a channel formed within the outer surface, where the channel formed within the outer surface of the second annular band is aligned with the channel formed within the outer surface of the first annular band. A blade is disposed within the channel formed within the first annular band and the channel formed within the second annular band.

Alternatively or additionally, the channel formed within the first annular band and the channel formed within the second annular band may each be adapted to secure the blade in place.

Another example may be found in a medical device that includes a catheter shaft including a distal region and an inflatable balloon secured to the distal region of the catheter shaft, the inflatable balloon including an outer surface. A blade assembly extends over and is secured to at least part of the outer surface. The blade assembly includes a plurality of blades and at least two rings adapted to secure each of the plurality of blades, each of the at least two rings moveable between an expanded configuration in which each of the at least two rings have an annular profile and a collapsed configuration in which each of the at least two rings collapse radially inwardly. Each of the at least two rings include an inner surface adapted to be secured relative to the outer surface of the inflatable balloon, an outer surface opposite the inner surface, a plurality of living hinges formed within the inner surface, and a plurality of living hinges formed within the outer surface. The plurality of living hinges formed within the inner surface and the plurality of living hinges formed within the outer surface cooperate to allow each of the plurality of blades to move radially inwardly in the collapsed configuration.

Alternatively or additionally, and for each of the plurality of blades, the plurality of living hinges formed within the outer surface may include a first pair of living hinges closest to that blade and a second pair of living hinges disposed adjacent and on either side of the first pair of living hinges.

Alternatively or additionally, the blade assembly may further include an elutable drug coating disposed on the blade assembly.

Alternatively or additionally, the blade assembly may further include a plurality of elongate members extending axially between a first ring of the at least two rings and a second ring of the at least two rings, the first ring, the second ring and the plurality of elongate members forming a cage that is adapted to be secured in place over the inflatable balloon.

Alternatively or additionally, each of the plurality of blades may be attached to one of the plurality of elongate members.

Alternatively or additionally, the plurality of elongate members may define a plurality of elongate void spaces between adjacent elongate members.

Alternatively or additionally, the inflatable balloon may define one or more balloon wings when the inflatable balloon is deflated, and the one or more balloon wings may be adapted to extend through one or more of the plurality of elongate void spaces.

Alternatively or additionally, each of the at least two rings may include slots formed in the outer surface thereof to allow each of the plurality of blades to be disposed in the slots.

Alternatively or additionally, the slots formed in a first ring of the at least two rings may be radially aligned with the slots formed in a second ring of the at least two rings.

Alternatively or additionally, the plurality of blades may include more than four blades.

Alternatively or additionally, the plurality of blades may include eight blades.

Another example may be found in a medical device that includes a catheter shaft including a distal region and an inflatable balloon secured to the distal region of the catheter shaft, the inflatable balloon including an outer surface with a distal cone and a proximal cone. A blade assembly extends over and is secured to at least part of the outer surface. The blade assembly includes one or more blades and a distal ring and a proximal ring moveable between an expanded configuration and a collapsed configuration and adapted to secure each of the one or more blades. The distal ring includes an inner surface adapted to be secured relative to the outer surface of the inflatable balloon and a plurality of living hinges formed within the distal ring and adapted to extend over the distal cone in the collapsed configuration. The proximal ring includes an inner surface adapted to be secured relative to the outer surface of the inflatable balloon and a plurality of living hinges formed within the proximal ring and adapted to extend over the proximal cone in the collapsed configuration.

Alternatively or additionally, the blade assembly may further include a plurality of elongate members extending axially between a distal ring and the proximal ring, the proximal ring, the distal ring and the plurality of elongate members forming a cage that is adapted to be secured in place over the inflatable balloon.

Alternatively or additionally, the plurality of elongate members may define a plurality of elongate void spaces between adjacent elongate members.

Alternatively or additionally, the inflatable balloon may define one or more balloon wings when the inflatable balloon is deflated, and the one or more balloon wings may be adapted to extend through one or more of the plurality of elongate void spaces.

Alternatively or additionally, the distal ring, the proximal ring, the plurality of elongate members and the plurality of blades may all be formed of the same material.

Alternatively or additionally, the blade assembly may further include an elutable drug coating disposed on the blade assembly.

Another example may be found in a medical device that includes a catheter shaft including a distal region and an inflatable balloon that is secured to the distal region of the catheter shaft, the inflatable balloon including an outer balloon surface. A blade assembly extends over and is secured to at least part of the outer surface, the blade assembly moveable between an expanded configuration and a collapsed configuration. The blade assembly includes a first annular band having an inner surface adapted to be secured relative to the outer balloon surface, a plurality of inner hinges formed in the inner surface, an outer surface opposite the inner surface, a plurality of outer hinges formed in the outer surface, and a channel formed in the outer surface. The blade assembly includes a second annular band having an inner surface adapted to be secured relative to the outer balloon surface, a plurality of inner hinges formed in the inner surface, an outer surface opposite the inner surface, a plurality of outer hinges formed in the outer surface, and a channel formed within the outer surface, where the channel formed within the outer surface of the second annular band is aligned with the channel formed within the outer surface of the first annular band. A blade is disposed within the channel formed within the first annular band and the channel formed within the second annular band.

Alternatively or additionally, the first annular band and the second annular band may include an elastomeric material or a shape memory material.

Alternatively or additionally, the channel formed within the first annular band and the channel formed within the second annular band may each be adapted to secure the blade in place.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE DRAWINGS

The disclosure may be more completely understood in consideration of the following description of various examples in connection with the accompanying drawings, in which:

FIGS. 7A, 7B, 7C and 7D are schematic views of a portion of the example blade assembly of FIG. 7, showing a living hinge formed in an outer surface and an inner surface, respectively, and in closed and open configurations;

Figure 1:
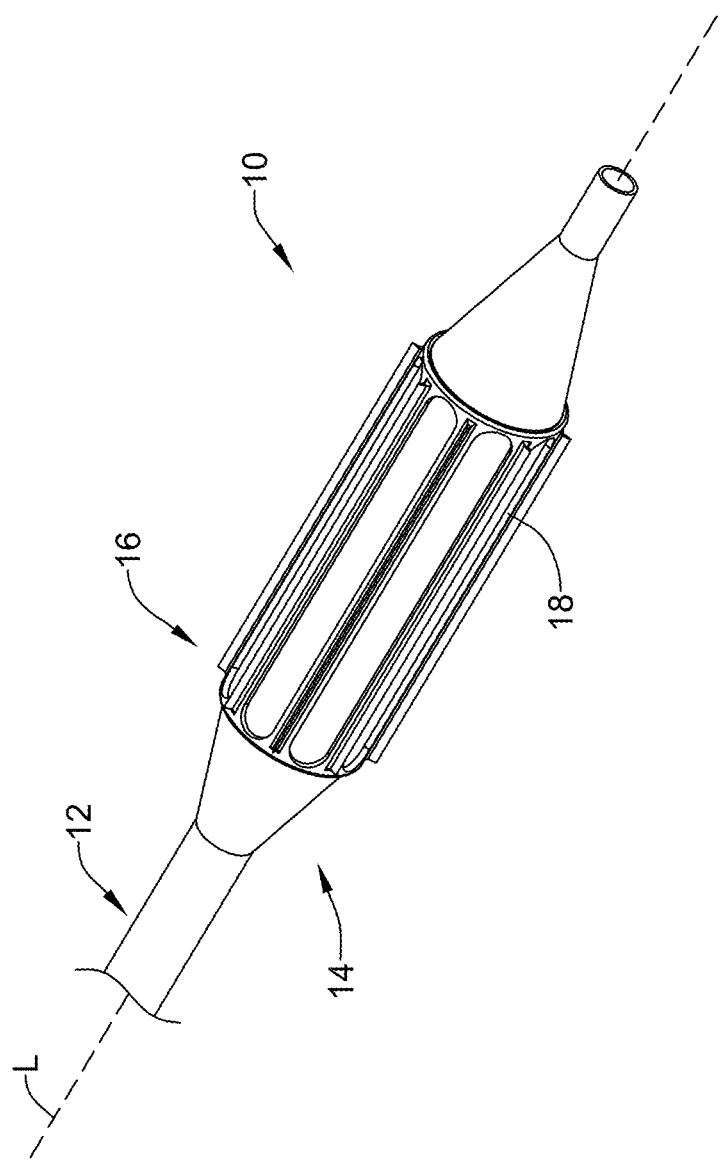
FIG. 1 is a perspective view of an example medical device.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

Percutaneous Coronary Intervention (PCI) includes imaging and understanding the level of vessel disease, preparing the diseased vessel and treating the diseased vessel with an appropriate interventional therapy as appropriate. FIG. 1 is a perspective view of an example medical device 10 that may be considered as adapted for preparing the diseased vessel for an appropriate interventional therapy, and may in some instances be considered as adapted for treating the diseased vessel. The medical device 10 pertains to an advanced blade assembly that may be mounted on a balloon catheter system for preparation and possibly treatment of the diseased vessel. An advanced blade assembly includes blade members may facilitate a PCI that requires nothing left behind, i.e., no stent, but also requires drug delivery to the stenotic lesion with drug coated or drug-eluting balloons, as the blades can induce therapeutic small dissections (of Type A and/or Type B) on the intima that, when applying the DCB treatment on the target lesion, are believed to augment the efficacy of the treatment. While described herein for treating stenosis in the coronary arteries, the example medical device 10 may be utilized in treating stenosis in other anatomies, or to break kidney stones (also known as renal calculi) and to treatment gallstones in the bile duct.

In some instances, the example medical device 10 may be utilized within a patient's vasculature in order to treat a stenosis within the vasculature. In some instances, the medical device 10 may be used to crack or cut a calcium lesion within a blood vessel. The medical device 10 may be considered a scoring and/or cutting balloon catheter, for example. The medical device 10 may be considered as having a longitudinal axis L. The medical device 10 includes a catheter shaft 12 having a distal region 14. The catheter shaft 12 may extend distally from a hub assembly (not shown), having one or more port for communicating with lumens extending through the catheter shaft 12. An inflatable balloon 16 may be secured to the distal region 14 of the catheter shaft 12. A blade assembly 18 may be mounted on or otherwise secured relative to the inflatable balloon 16. The blade assembly 18 may be considered as being moveable between a collapsed configuration for delivery and an expanded configuration (as shown) during use. In some instances, the medical device 10 may be advanced over a guidewire, through the vasculature, to a target area. Once positioned at the target area in the vasculature, the inflatable balloon 16 may be inflated to exert a radially outward force on a lesion, as the blade assembly 18 engages the lesion. Thus, the blade assembly 18 may crack, cut or score the lesion, modifying the plaque to facilitate enlarging the lumen proximate the lesion. The target area may be within any suitable peripheral or cardiac vessel lumen position.

Figure 2:
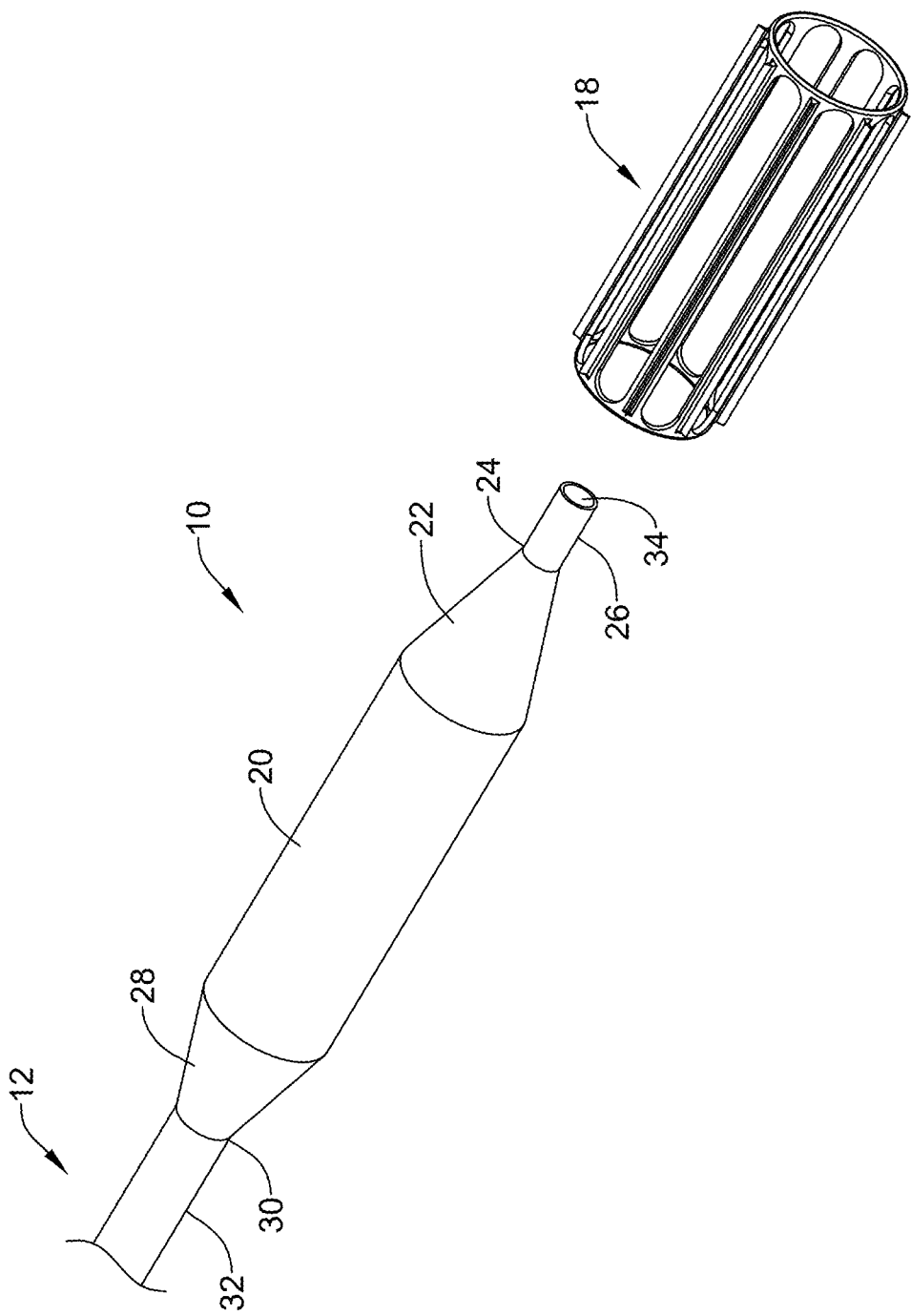
FIG. 2 is an exploded perspective view of the example medical device of FIG. 1.

FIG. 2 is an exploded perspective view of the medical device 10, with the blade assembly 18 separated from the inflatable balloon 16 in order to show additional features of the inflatable balloon 16. The inflatable balloon 16 may be seen as including a constant diameter body segment 20, a distal cone segment 22 extending distally from the body segment 20, and a proximal cone segment 24 extending proximally from the body segment 20. Thus, the body segment 20 may be positioned between the distal cone segment 22 and the proximal cone segment 24. In some instances, the constant diameter body segment 20 may have a length and diameter (when inflated) to accommodate the blade assembly 18. The distal cone segment 22 may taper distally from the constant diameter segment 20 to a distal waist 24 where the inflatable balloon 16 is fixedly attached, or otherwise joins the catheter shaft 12, such as an inner tubular member 26 of the catheter shaft 12. The proximal cone segment 28 may taper proximally from the constant diameter segment 20 to a proximal waist 30 at which the inflatable balloon 16 is fixedly attached, or otherwise joins the catheter shaft 12, such as an outer tubular member 32 of the catheter shaft 12. It will be appreciated that the catheter shaft 12 may include both the inner tubular member 26 and the outer tubular member 32, in which the inner tubular member 26 extends through the lumen of the outer tubular member 32, or otherwise arranged with the outer tubular member 32. In other instances, the catheter shaft 12 may have a different construction, such as a multi-lumen extruded tubular member, if desired.

The inflatable balloon 16 may be made from angioplasty balloon materials including polymers such as polyethylene terephthalate (PET), polytetrafluoroethylene (PTFE), ethylene tetrafluoroethylene (ETFE), polybutylene terephthalate (PBT), polyurethane, polyvinylchloride (PVC), polyetherester, polyester, polyamide, elastomeric polyamides, polyether block amide (PEBA), as well as other suitable materials, or mixtures, combinations, copolymers thereof, polymer/metal composites, and the like. In some instances, the inflatable balloon 16 may include a single layer of material, whereas in other instances the inflatable balloon 16 may be of a multi-layer construction, including a plurality of layers of materials with or without a reinforcing structure, such as a braided or woven layer. For instance, the inflatable balloon 16 may be formed as a co-extrusion or tri-layer extrusion in some instances.

The inflatable balloon 16 may be configured so that the inflatable balloon 16 includes one or more "wings" or wing-shaped regions when the inflatable balloon 16 is deflated. The balloon wing or wings may be configured in a variety of different configurations. In some instances, the wings may be configured so that the monolithic blade members 18 can be positioned at the inward-most positions of the deflated inflatable balloon 16, with the wings of the balloon folds positioned between adjacent monolithic blade members 18. This arrangement may reduce the exposure of the monolithic blade members 18 to the blood vessel during delivery of the inflatable balloon 16 to the lesion and/or assist in achieving a small balloon diameter in the deflated state. Other arrangements are possible, including balloon wings that are folded in a clockwise configuration or a counterclockwise configuration.

As noted above, the catheter shaft 12 may include both the inner tubular member 26 and the outer tubular member 32, where the inner tubular member 26 extends through at least a portion of the outer tubular member 32. The inner tubular member 26 and the outer tubular member 32 may each be manufactured from a number of different materials. For example, the inner tubular member 26 and the outer tubular member 32 may be made of metals, metal alloys, polymers, metal-polymer composites or any other suitable materials.

The inner tubular member 26 and the outer tubular member 32 may be arranged in any appropriate way. For example, in some embodiments the inner tubular member 26 can be disposed coaxially within the outer tubular member 32. According to these embodiments, the inner tubular member 26 and the outer tubular member 32 may or may not be secured to one another along the general longitudinal axis of the catheter shaft 12. Alternatively, the inner tubular member 26 may follow the inner wall or otherwise be disposed adjacent the inner wall of the outer tubular member 32. In other embodiments, the inner tubular member 26 and the outer tubular member 32 may be arranged in another desired fashion.

The inner tubular member 26 may include an inner lumen 34. In at least some instances, the inner lumen 34 is a guidewire lumen for receiving a guidewire therethrough. Accordingly, the medical device 10 can be advanced over the guidewire to the desired location. The guidewire lumen 34 may extend along essentially the entire length of the catheter shaft 12 such that the medical device 10 resembles a traditional "over-the-wire" catheter. Alternatively, the guidewire lumen 34 may extend along only a portion of the catheter shaft 12 such that the medical device 10 resembles a "single-operator-exchange" or "rapid-exchange" catheter.

The catheter shaft 12 may include a lumen for a guidewire as well as an inflation lumen that may be used, for example, to transport inflation media to and from the inflatable balloon 16 to selectively inflate and/or deflate the inflatable balloon 16. In some instances, multi-lumen tubing may be used to provide the desired lumens. In some instances, concentric inner and outer tubular members may be used to provide the desired lumens. The location and position of the inflation lumen may vary, depending on the configuration of the outer tubular member 32 and the inner tubular member 26. For example, when the outer tubular member 32 surrounds the inner tubular member 26, the inflation lumen may be defined within the space between the outer tubular member 32 and the inner tubular member 26. In instances in which the outer tubular member 32 is disposed alongside the inner tubular member 26, then the inflation lumen may be the lumen of the outer tubular member 32.

The inflatable balloon 16 may be coupled to the catheter shaft 12 in any of a number of suitable ways. For example, the inflatable balloon 16 may be adhesively or thermally bonded to the catheter shaft 12. In some embodiments, the proximal waist 30 of the inflatable balloon 16 may be bonded to the catheter shaft 12, for example, bonded to a distal end of the outer tubular member 32, and the distal waist 24 of the inflatable balloon 16 may be bonded to the catheter shaft 12, for example, bonded to a distal end of the inner tubular member 26. The exact bonding positions, however, may vary.

Figure 3:
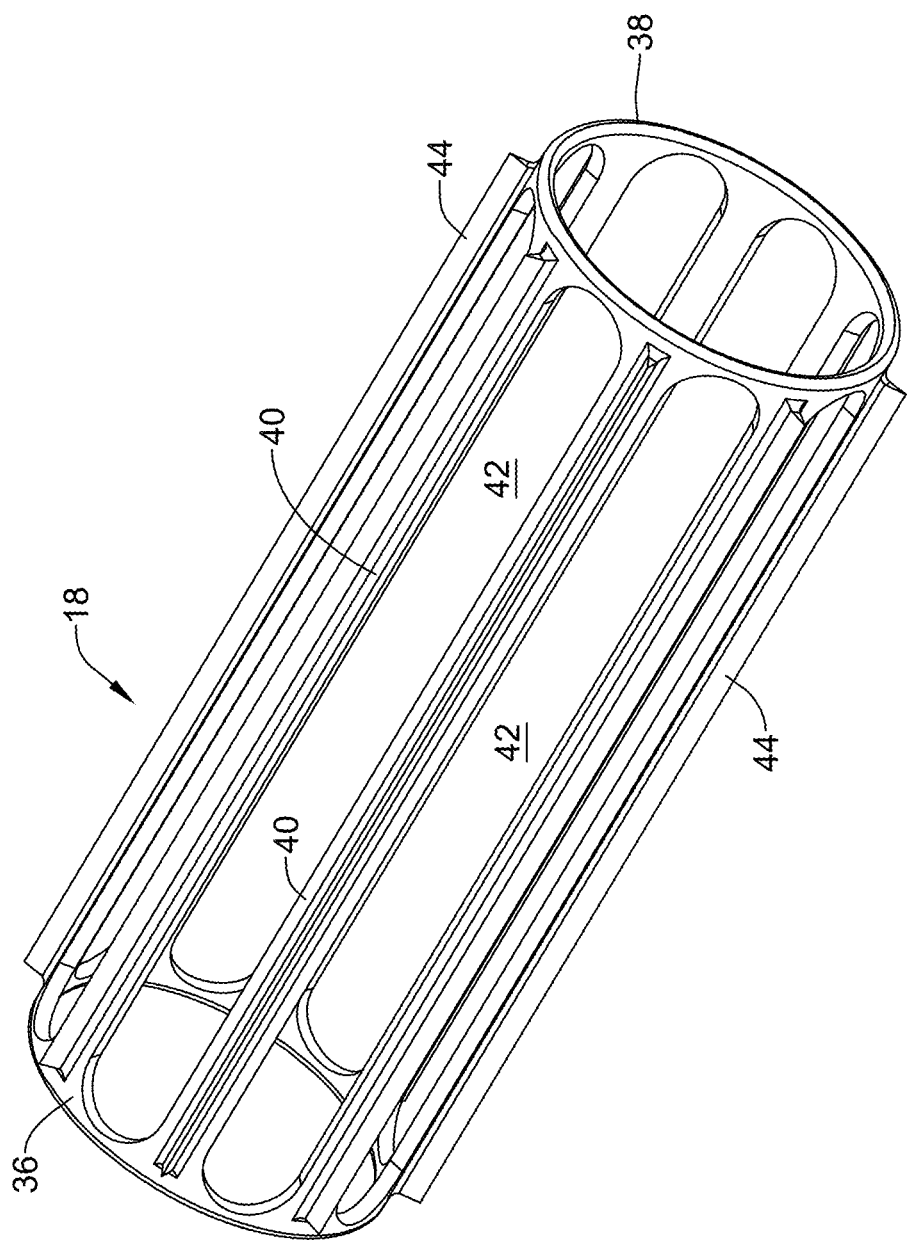
FIG. 3 is a perspective view of an example blade assembly forming a part of the example medical device of FIG. 1.

FIG. 3 provides a perspective view of the blade assembly 18. The blade assembly 18 includes a first annular ring or band 36 and a second annular ring or band 38. In some instances, depending on how the blade assembly 18 is mounted relative to the inflatable balloon 16, the first annular ring or band 36 may be considered as being a proximal annular ring or band, and the second annular ring or band 38 may be considered as being a distal annular ring or band. A number of elongate members 40 (only two are labeled, for clarity) extend from the first ring 36 to the second ring 38. It will be appreciated that a corresponding number of elongate void spaces 42 are defined between adjacent elongate members 40. As shown, each of the elongate void spaces 42 have a semi-circular profile at either end of each of the elongate void spaces 42. In some instances, each of the elongate void spaces 42 may have a triangular profile at either end of the elongate void space 42. In some instances, each of the elongate void spaces 42 may have a rectilinear profile, or any other desired profile, at either end of the elongate void space 42.

As will be discussed, the first ring 36 and the second ring 38 may each include living hinges that allow the blade assembly 18 to move between a collapsed configuration for delivery and an expanded configuration (as shown) for use. Living hinges are thin, flexible hinges or connectors made from the same material as the two pieces connected by the thin, flexible hinge. In other words, the living hinge is a flexible connection between two components allowing pivotable movement between the two components which is formed as a monolithic or unitary portion of the two components. The living hinges may also allow the blade assembly 18 to subsequently move from the expanded configuration back to the collapsed configuration for removal of the medical device 10 from the vasculature, or to reposition the medical device 10 within the vasculature.

In some instances, as shown, a number of blades 44 (only two are labeled, for clarity) extend radially outwardly from each of the elongate members 40. In some instances, the blades 44 may be separately formed and subsequently secured in place along each of the elongate members 40. In some instances, the blades 44 are integrally or monolithically formed as part of the elongate members 40. In some instances, the entire blade assembly 18, including the first ring 36, the second ring 38, the elongate members 40 and the blades 44 may be laser cut or otherwise formed from a cylindrical blank. In some instances, the entire blade assembly 18, including the first ring 36, the second ring 38, the elongate members 40 and the blades 44 may be made from any suitable material such as a metal, metal alloy, polymer, metal-polymer composite, and the like, or any other suitable material. For example, the entire blade assembly 18, including the first ring 36, the second ring 38, the elongate members 40 and the blades 44 may be made from stainless steel, titanium, nickel-titanium alloys, tantalum, iron-cobalt-nickel alloys, or other metallic materials in some instances. In some instances, parts of the blade assembly 18 may be separately made and then subsequently secured together.

While each of the blades 44 are shown as extending substantially (at least 90 percent or at least 95 percent of the length) the entire length of the elongate members 40, it will be appreciated that in some instances, at least some of the blades 44 may include two or more distinct blade sections that are axially aligned with one another such that together the two or more distinct blade sections extend substantially the entire length of the elongate member 40 upon which they are disposed.

While the blade assembly 18 is shown as including a total of eight blades 44, this is merely illustrative. The blade assembly 18 may include one, two, three, four, five, six, seven, nine, ten or more blades 44 extending along at least some of the elongate members 40. In some instances, some of the elongate members 40 include a blade 44 while others of the elongate members 40 do not include a blade 44 (i.e., are devoid of a blade 44). In some instances, each of the elongate members 40 include a corresponding blade 44 that may be integrally formed as part of the elongate member 40 or separately formed and subsequently attached. In some instances, the elongate members 40 and the elongate blades 44 extend longitudinally in parallel with each other and parallel with the longitudinal axis L (FIG. 1). In some instances, at least some of the elongate members 40 may be disposed in a manner that is not parallel with the longitudinal axis L. At least some of the blades 44 may be arranged in any regular, irregular or any other suitable pattern.

Figure 4:
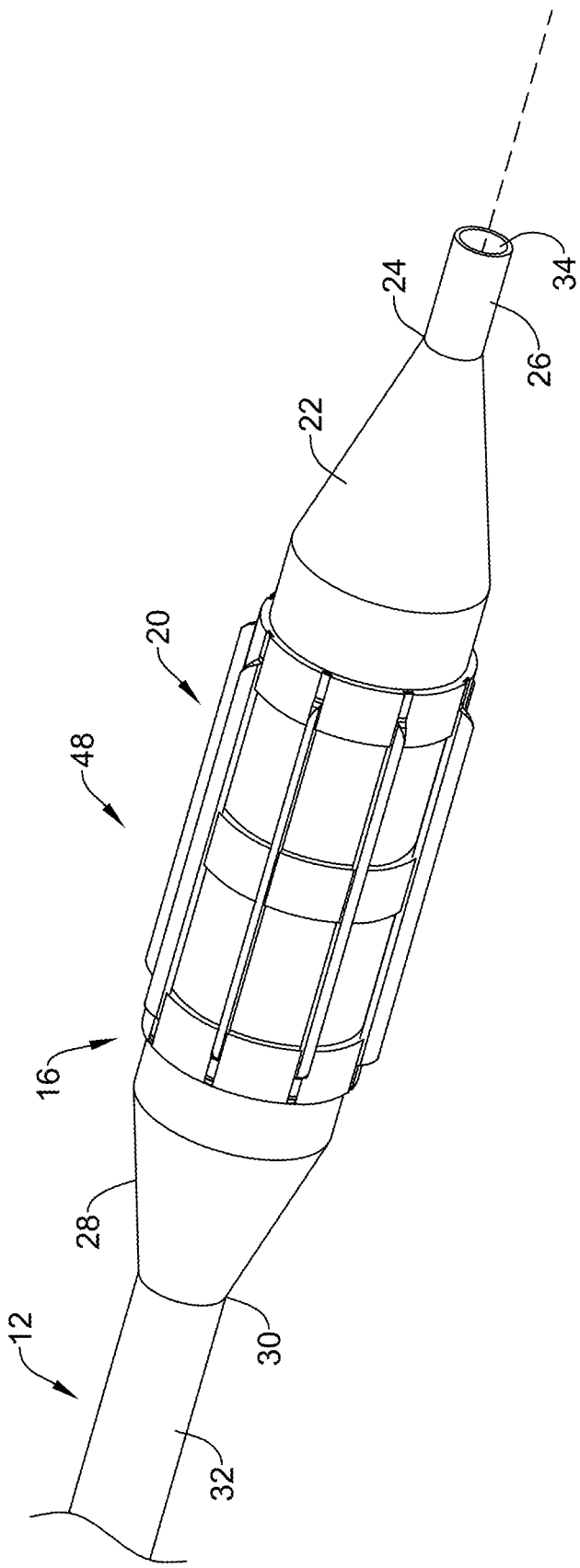
FIG. 4 is a perspective view of an example medical device.

FIG. 4 is a perspective view of an example medical device 46. In some instances, the example medical device 46 may be utilized within a patient's vasculature in order to treat a stenosis within the vasculature. In some instances, the medical device 46 may be used to crack or cut a calcium lesion in a blood vessel. The medical device 46 may be considered a scoring and/or cutting balloon catheter, for example. The medical device 46 may be considered as having a longitudinal axis L. The medical device 46 includes a blade assembly 48 that may be mounted or otherwise secured relative to the inflatable balloon 16. The blade assembly 48 may be considered as being moveable between a collapsed configuration for delivery and an expanded configuration (as shown) during use. In some instances, the medical device 46 may be advanced over a guidewire, through the vasculature, to a target area. Once positioned at the target area in the vasculature, the inflatable balloon 16 may be inflated to exert a radially outward force on a lesion, as the blade assembly 48 engages the lesion. Thus, the blade assembly 48 may crack, cut or score the lesion to facilitate enlarging the lumen proximate the lesion. The target area may be within any suitable peripheral or cardiac vessel lumen position.

Figure 5:
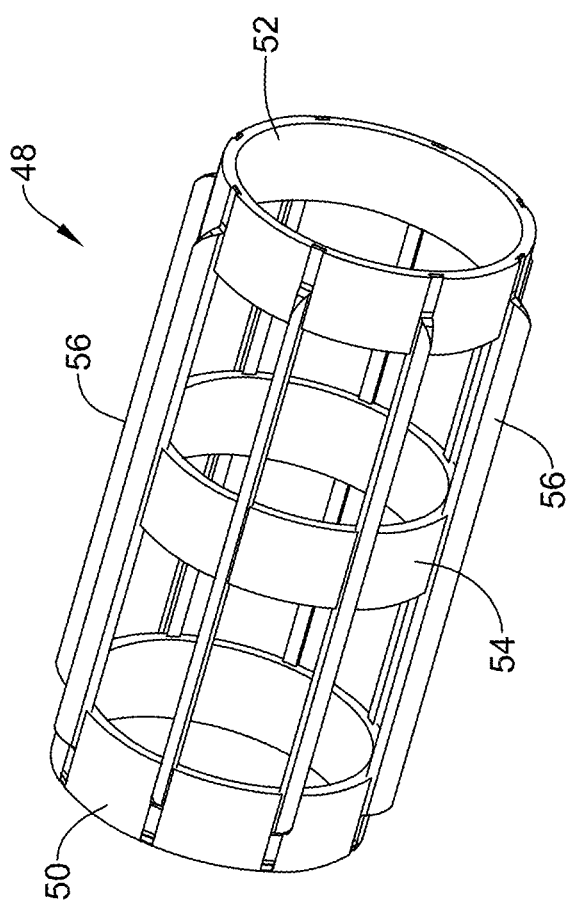
FIG. 5 is a perspective view of an example blade assembly forming a part of the example medical device of FIG. 4.

As best seen in FIG. 5, the blade assembly 48 includes a first annular ring or band 50 and a second annular ring or band 52. In some instances, depending on how the blade assembly 48 is mounted relative to the inflatable balloon 16, the first annular ring or band 50 may be considered as being a proximal annular ring or band, and the second annular ring or band 52 may be considered as being a distal annular ring or band. In some instances, the blade assembly 48 may include one or more intermediate annular rings or bands. In some instances, depending for example on the overall length of the blade assembly 48, the blade assembly 48 may include a third annular ring or band 54. In some instances, the blade assembly 48 may include four or more annular rings or bands (not shown).

As will be discussed, the first ring 50 and the second ring 52 (and any additional rings such as the third ring 54) may each include living hinges that allow the blade assembly 48 to move between a collapsed configuration for delivery and an expanded configuration (as shown) for use. The living hinges may also allow the blade assembly 48 to subsequently move from the expanded configuration back to the collapsed configuration for removal of the medical device 46 from the vasculature, or to reposition the medical device 46 within the vasculature.

Figure 6:
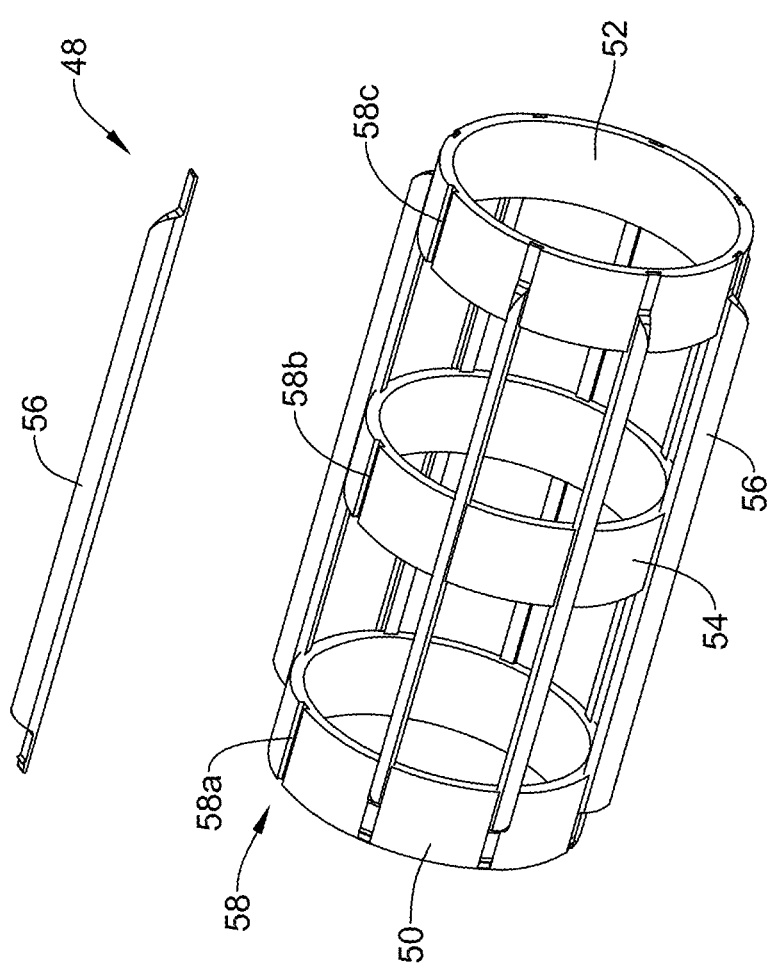
FIG. 6 is a partially exploded view of the example blade assembly of FIG. 5.

In some instances, as shown, a number of blades 56 (only two are labeled, for clarity) extend between the first ring 50 and the second ring 52 (and any intervening rings such as the third ring 54). In some instances, each of the first ring 50, the second ring 52 and the third ring 54 (and any additional rings, if present) include slots or channels 58, individually labeled as 58a, 58b and 58c. The slots or channels 58 are easiest to visualize in FIG. 6, which is similar to FIG. 5 but shows one of the blades 56 pulled away to show the slots or channels 58. It will be appreciated that the slot or channel 58a is aligned with the slot or channel 58b, and the slot or channel 58b is aligned with the slot or channel 58c such that a blade 56 may extend through each of the slots or channels 58. While not labeled, it will be appreciated that the first ring 50, the second ring 54 and the third ring 56 (and any additional rings) includes similar slots or channels to accommodate each of the blades 56.

In some instances, as shown, the slots or channels 58 are adapted to allow the blades 56 to slide into the slots or channels 58. For instance, in some instances the blades 56 may be slid into the slots or channels 58 in a longitudinal direction. In other instances, the blades 56 may be slid into the slots or channels 58 in a radial direction. This can help to locate each of the blades 56 radially about the blade assembly 48, for example. Each of the blades 56 may be secured (e.g., adhesively secured) in place within the slots or channels 58. In some instances, each of the blades 56 may be welded or soldered in place. In some instances, while not shown, the slots or channels 58 may provide a lock and key interaction (e.g., a dovetail connection) with the blades 56, such that a blade 56 can slide axially within the slots or channels 58, but is constrained from moving radially outwardly with respect to the slots or channels 58. Welding, soldering or adhesives may be used to limit or prevent relative axial movement of any of the blades 56 relative to the blade assembly 48.

In some instances, the entire blade assembly 48, including the first ring 50, the second ring 52, the third ring 54 and each of the blades 56 may be made from any suitable material such as a metal, metal alloy, polymer, metal-polymer composite, and the like, or any other suitable material. For example, the entire blade assembly 48, including the first ring 50, the second ring 52, the third ring 54 and the blades 56 may be made from stainless steel, titanium, nickel-titanium alloys, tantalum, iron-cobalt-nickel alloys, or other metallic materials in some instances. In some instances, parts of the blade assembly 48 may be separately made and then subsequently secured together.

While each of the blades 56 are shown as extending substantially (at least 90 percent or at least 95 percent of the length) the entire length of the blade assembly 56, it will be appreciated that in some instances, at least some of the blades 56 may include two or more distinct blade sections that are axially aligned with one another such that together the two or more distinct blade sections extend substantially the entire length of the blade assembly 48.

While the blade assembly 48 is shown as including a total of eight blades 56, this is merely illustrative. The blade assembly 48 may include one, two, three, four, five, six, seven, nine, ten or more blades 56. In some instances, the and the blades 56 extend longitudinally in parallel with each other and parallel with the longitudinal axis L (FIG. 4). In some instances, at least some of the blades 56 may be arranged in any regular, irregular or any other suitable pattern.

Figure 7:
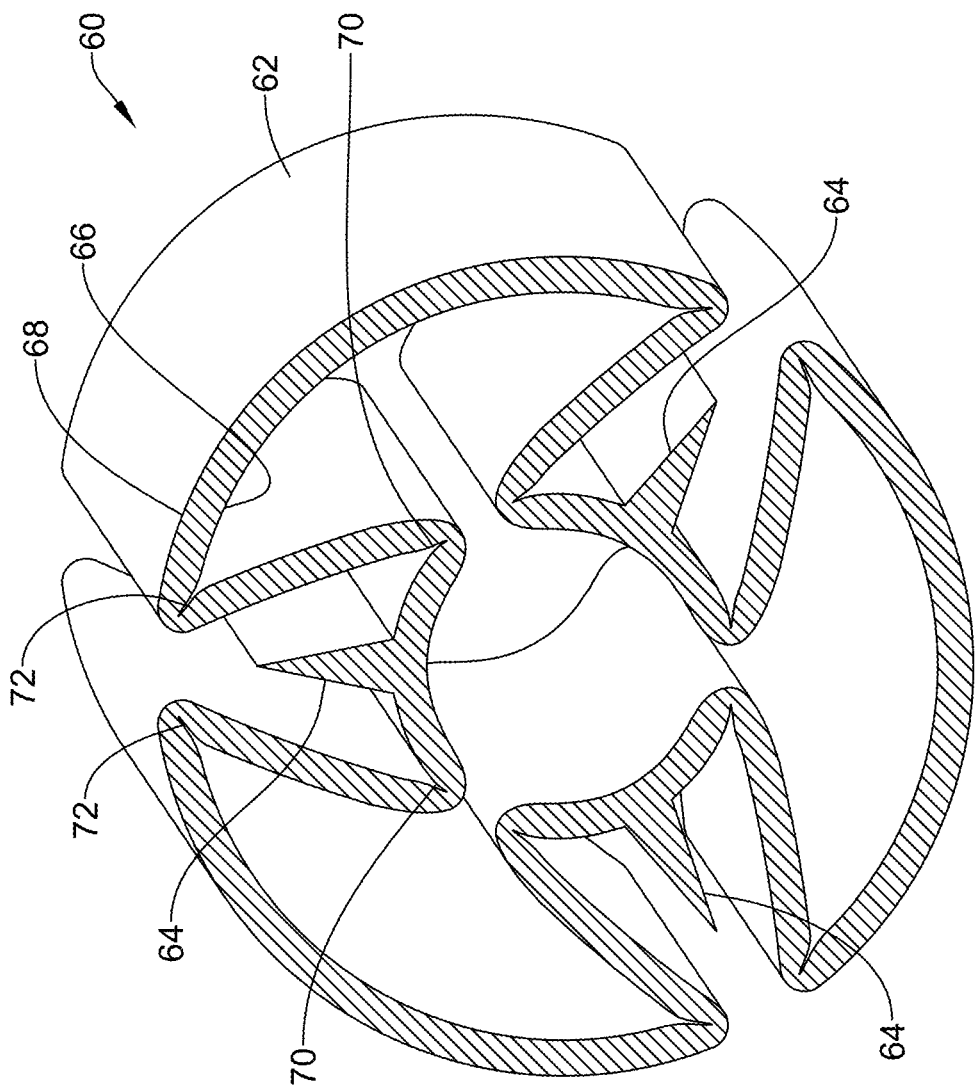
FIG. 7 is a perspective view through a portion of an example blade assembly.

As noted, the blade assemblies described herein, including the blade assembly 18 and the blade assembly 48, include living hinges that allow the blade assembly 18 and the blade assembly 48 to move between an expanded configuration for use (as shown in FIGS. 1-6) and a collapsed configuration. FIG. 7 is a perspective view cross-sectional view of an example blade assembly 60 that includes a ring or band 62. The ring or band 62 may be considered as being an example of any of the first ring 36, the second ring 48, the first ring 50, the second ring 52 or the third ring 54, as discussed above. In FIG. 7, the blade assembly 60 is shown in a collapsed configuration. In some instances, as shown, the blade assembly 60 may include living hinges that allow the ring or band 62 to collapse in such a way as to allow each of several blades 64 to move radially inwardly, towards a center of the blade assembly 60, with portions of the ring or band 62 extending radially above the blades 64, thereby limiting possible damage that the blades 64 could otherwise do if they contacted tissue during delivery of a medical device including the blade assembly 60. While the blades 64 are shown as being integrally formed with the ring or band 62, in some instances the blades 64 may be separately formed and subsequently attached to the ring or band 62, for example.

The ring or band 62 may be considered as including an inner surface 66 and an outer surface 68. The ring or band 62 may extend around a circumference of an inflatable balloon. The inner surface 66 may be adapted to be secured in place to an inflatable balloon (such as but not limited to the inflatable balloon 16). The outer surface 68 includes a pair of living hinges 70 that are formed in the outer surface 68 and that are closest to (and disposed on either side of) one of the blades 64. In other words, each blade 64 may be positioned between adjacent living hinges 70. The inner surface 66 includes a pair of living hinges 72 that are formed in the inner surface 66 and that are disposed on either side of the living hinges 70. In other words, a living hinge 70 may be positioned between a blade 64 and a living hinge 72. FIGS. 7A and 7B show a living hinge 70 in a collapsed configuration (FIG. 7A) and an expanded configuration (FIG. 7B). FIGS. 7C and 7D show a living hinge 72 in a collapsed configuration (FIG. 7C) and an expanded configuration (FIG. 7D). It will be appreciated that there may be a pair of outer surface living hinges and an adjoining pair of inner surface living hinges for each of the blades 64 shown in FIG. 7.

Figure 8A:
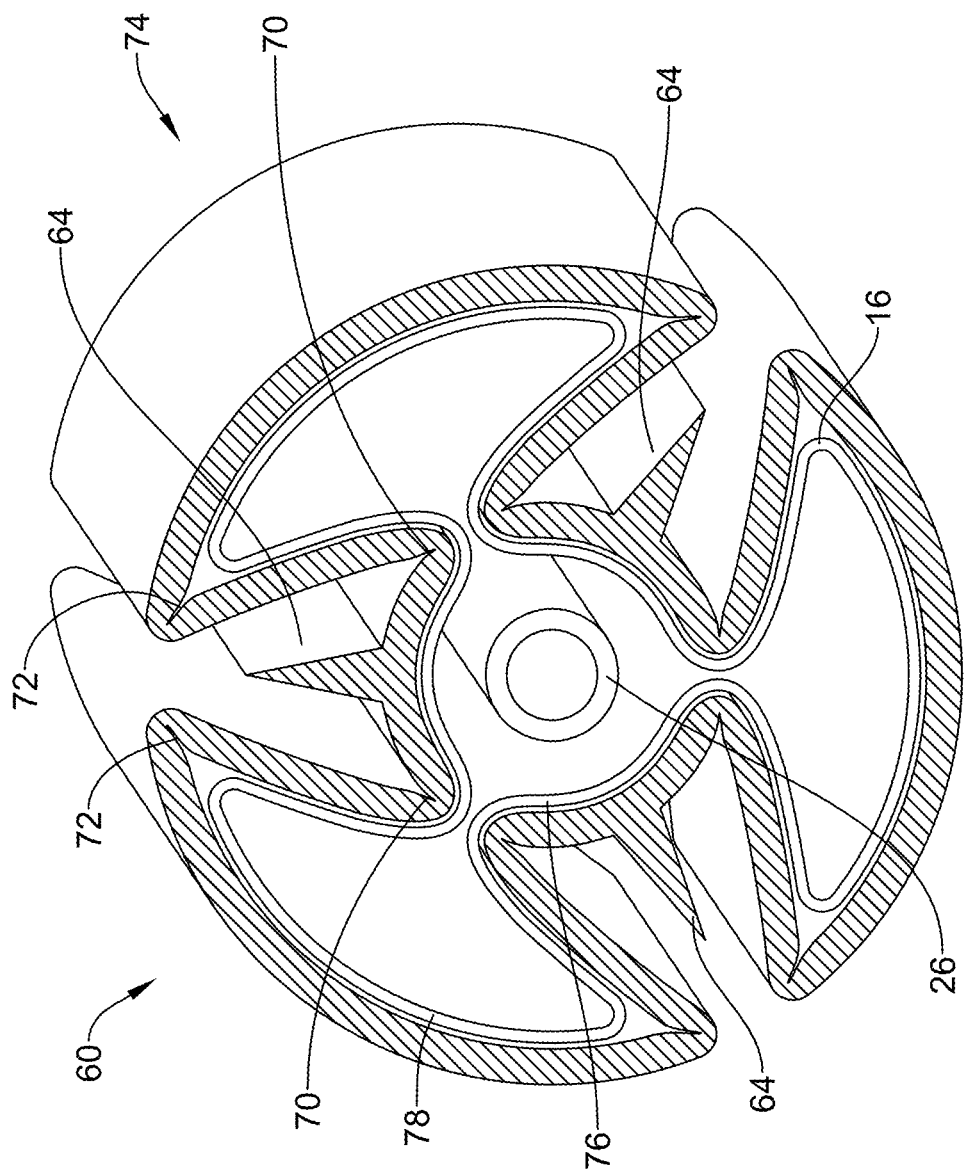
FIG. 8A is a perspective cross-sectional view through an example medical device shown in a collapsed configuration.
Figure 8B:
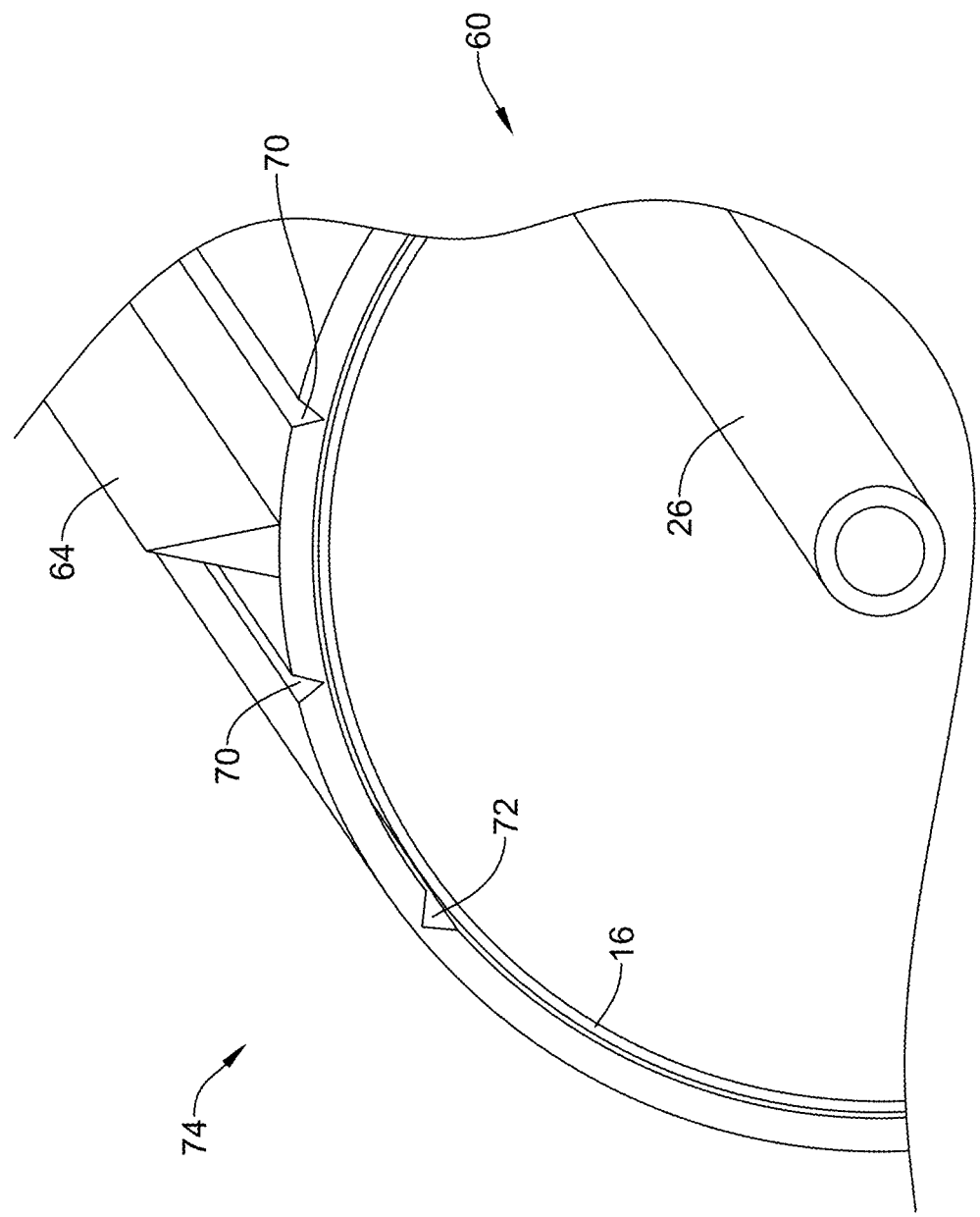
FIG. 8B is a perspective cross-sectional view through the example medical device of FIG. 8A, shown in an expanded configuration.

In some instances, metal additives technologies such as but not limited to 3D printing may be used to manufacture the rings with living hinges and blades in a single-piece blade assembly. As an example, 3D printing with metallic materials may be used. FIG. 8A is a perspective cross-sectional view of an example medical device 74 that includes the blade assembly 60 shown secured relative to the inflatable balloon 16. In some instances, the blade assembly 60 may be secured onto the inflatable balloon 16 via an adhesive on an inner surface of the blade assembly 60. The medical device 74 is shown in a collapsed configuration. The medical device 74 includes the inner tubular member 26. It can be seen that in the collapsed configuration, the inflatable balloon 16 includes a central minimal diameter portion 76 and several wings 78 extending radially outwardly from the central minimal diameter portion 76. When the inflatable balloon 16 is inflated, as shown for example in FIG. 8B, the central minimal diameter portion 76 and the wings 78 expand radially outwardly, causing the blade assembly 60 to also expand radially outwardly. This leaves the living hinges 70 and 72 in an open, expanded configuration, such as shown in FIGS. 7B and 7D, respectively.

Figure 9A:
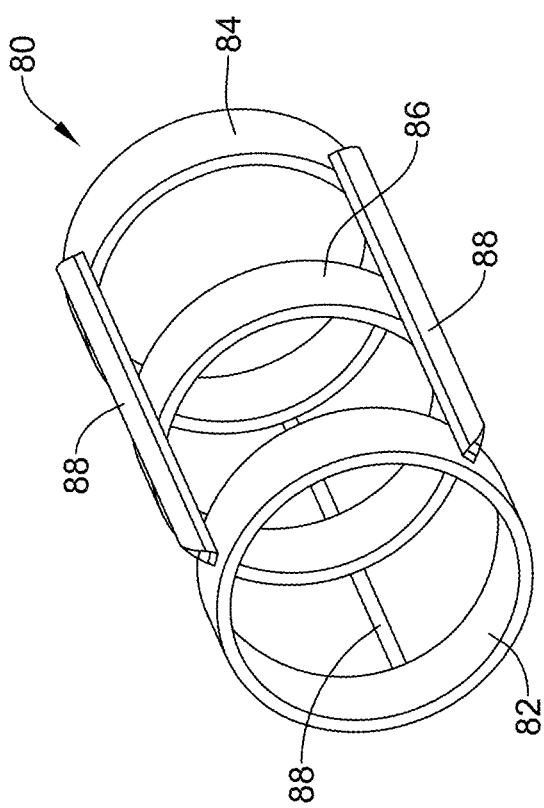
FIG. 9A is a perspective view of an example blade assembly.
Figure 9B:
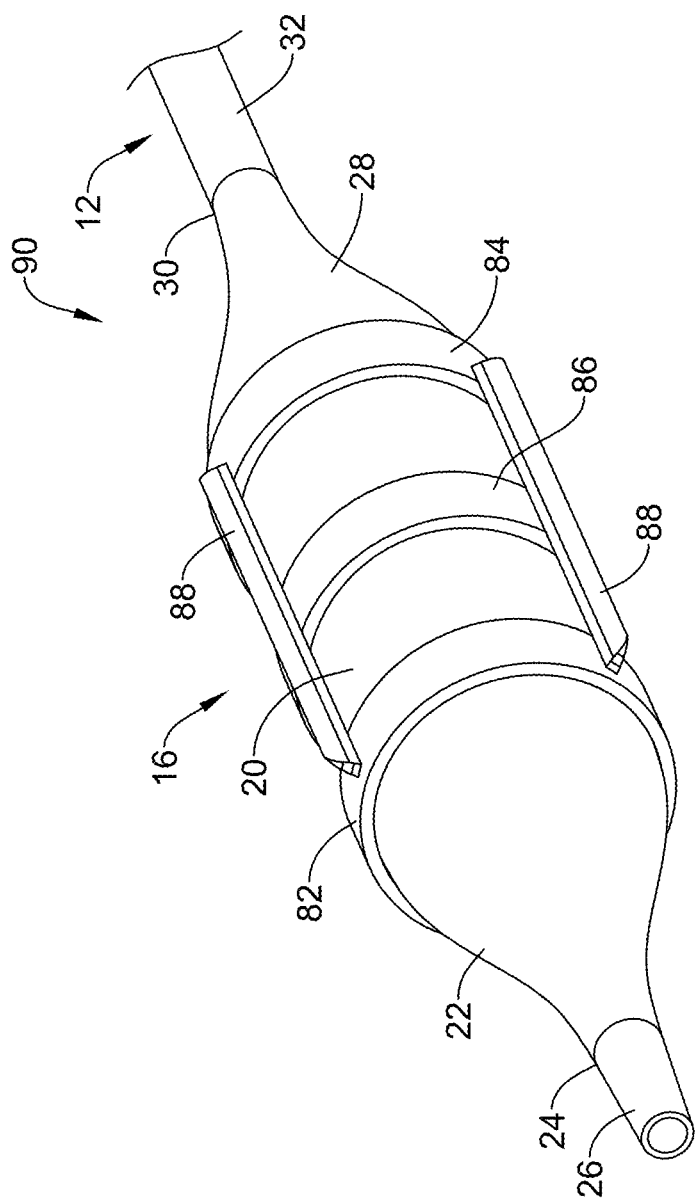
FIG. 9B is a perspective view of an example medical device including the example blade assembly of FIG. 9A.

FIG. 9A is a perspective view of an example blade assembly 80 that includes a first ring 82, a second ring 84 and an intermediate third ring 86. The blade assembly 80 includes several blades 88. While a total of three blades 88 are shown, it will be appreciated that this is merely illustrative, as the blade assembly 80 may include any number of blades 88. In some instances, the blades 88 may be secured (e.g., adhesively secured) to each of the first ring 82, the second ring 84 and the third ring 86. In some instances, the first ring 82, the second ring 84 and the third ring 86 may each include living hinges that allow the blade assembly 80 to move back and forth between an expanded configuration (as shown) and a collapsed configuration. In some instances, the living hinges within the first ring 82, the second ring 84 and the third ring 86 may allow the blades 88 to move radially inwardly in the collapsed configuration such that the blades 88 are protected from contacting tissue by portions of the first ring 82, the second ring 84 and the third ring 86. FIG. 9B is a perspective view of an example medical device 90. The example medical device 90 represents the blade assembly 80 disposed on the inflatable balloon 16.

Figure 10A:
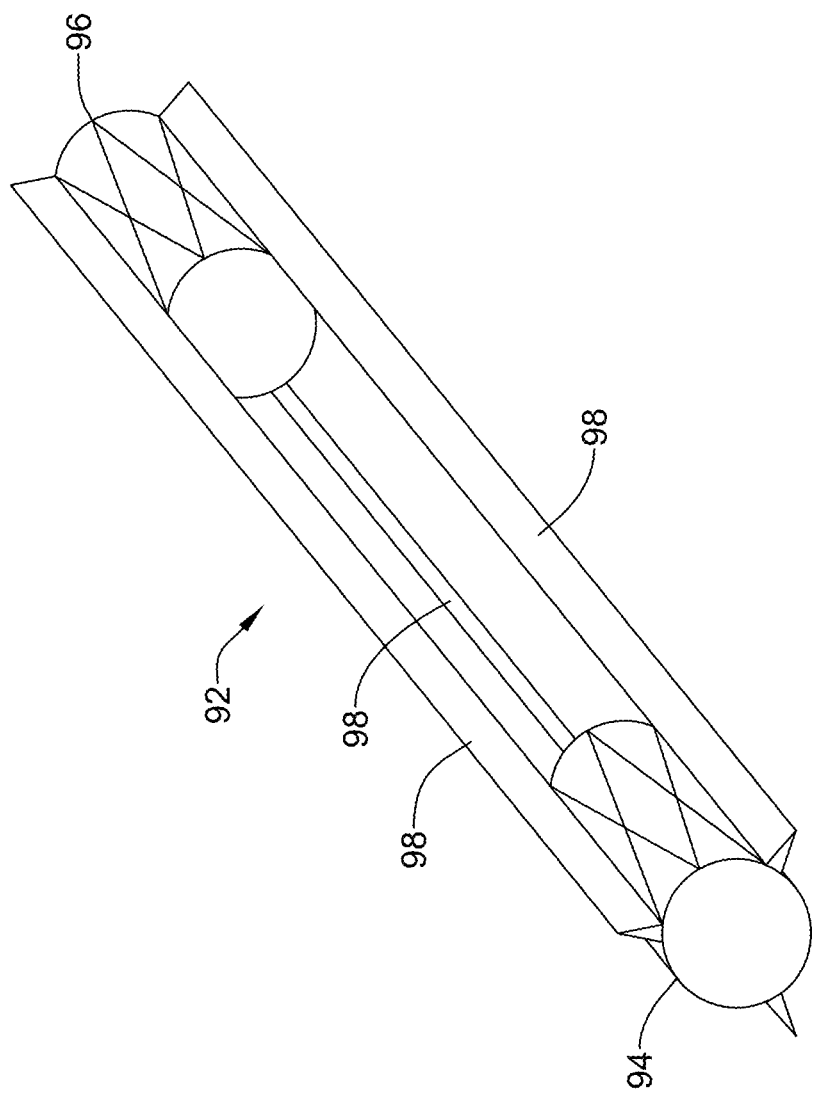
FIG. 10A is a perspective view of an example blade assembly.
Figure 10B:
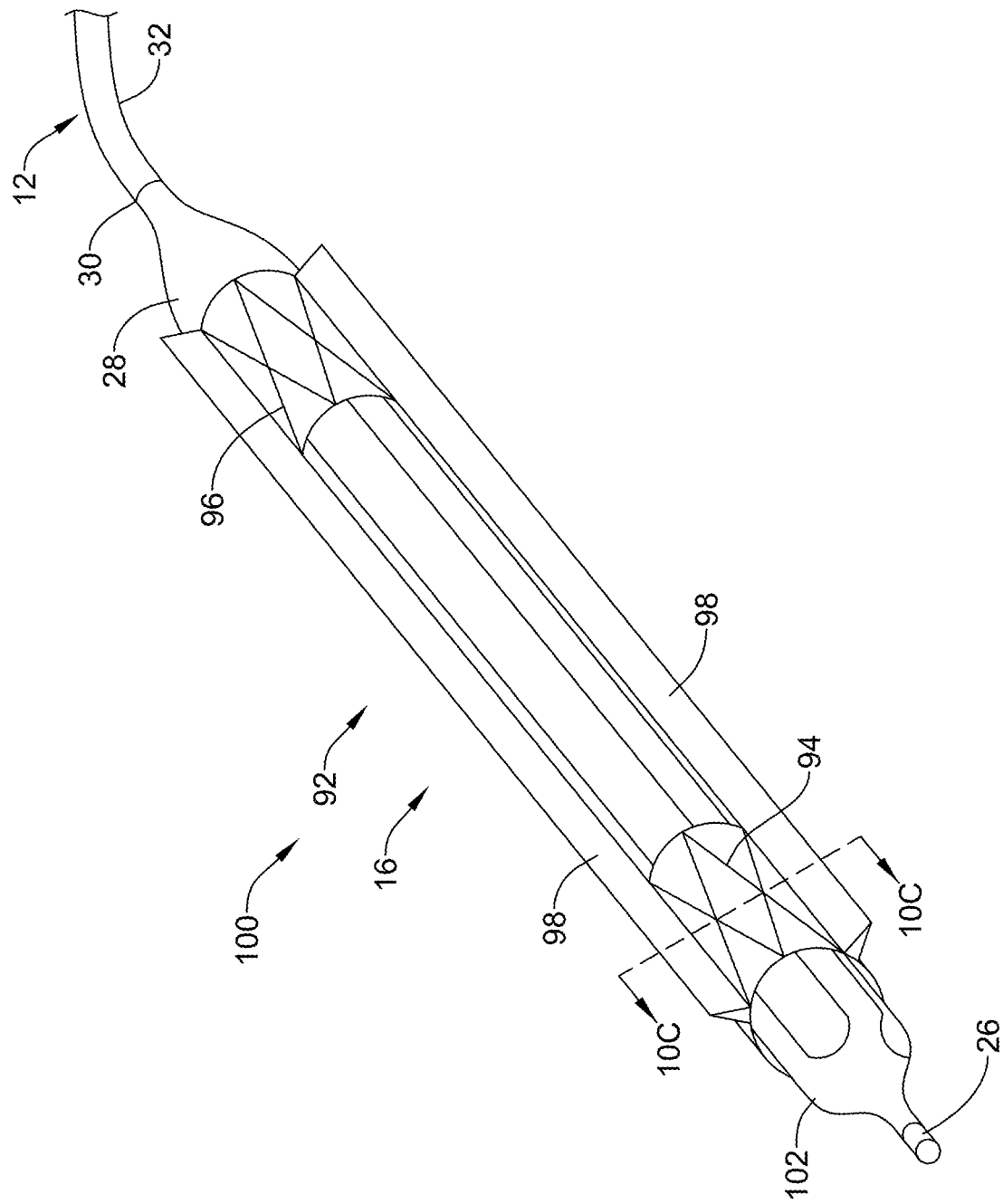
FIG. 10B is a perspective view of an example medical device including the example blade assembly of FIG. 10A.

FIG. 10A is a perspective view of an example blade assembly 92 that includes a first stent-like structure 94 and a second stent-like structure 96. In some instances, the stent-like structures 94 and 96 may be manufactured as separate pieces. In some instances, an exam some instances, metal additive technologies such as 3D printing with metallic materials may be used to manufacture the blade assembly 92 as a unitary structure. In some instances, the blade assembly 92 may be manufactured (e.g., laser cut) from a thick tube. FIG. 10A shows the stent-like structures 94 and 96 secured relative to the inflatable balloon 16. While the blade assembly 92 is shown with distinct first and second stent-like structures 94 and 96, in some instances the blade assembly 92 may include a single stent-like structure that extends a length of the blade assembly 92. The first and second stent-like structures 94 and 96 may each have an inner surface that is adapted to be secured relative to the inflatable balloon 16, for example. It will be appreciated that the first and second stent-like structures 94 and 96 may be moveable between an expanded configuration and a collapsed configuration as a result of inflation and deflation of the inflatable balloon 16 in combination with the actions of the living hinges 136 and 138 (as will be discussed with respect to FIGS. 11A and 11b). The blade assembly 92 includes a number of blades 98 that are secured to the first stent-like structure 94 and the second stent-like structure 96. While a total of three blades 98 are shown, this is merely illustrative, as the blade assembly 92 may include any number of blades 98. FIG. 10B is a perspective view of an example medical device 100 that includes the blade assembly 92 mounted onto the inflatable balloon 16. The distal portion of the inflatable balloon 16 may be seen as being deflated and folded to include several wings 102.

Figure 10C:
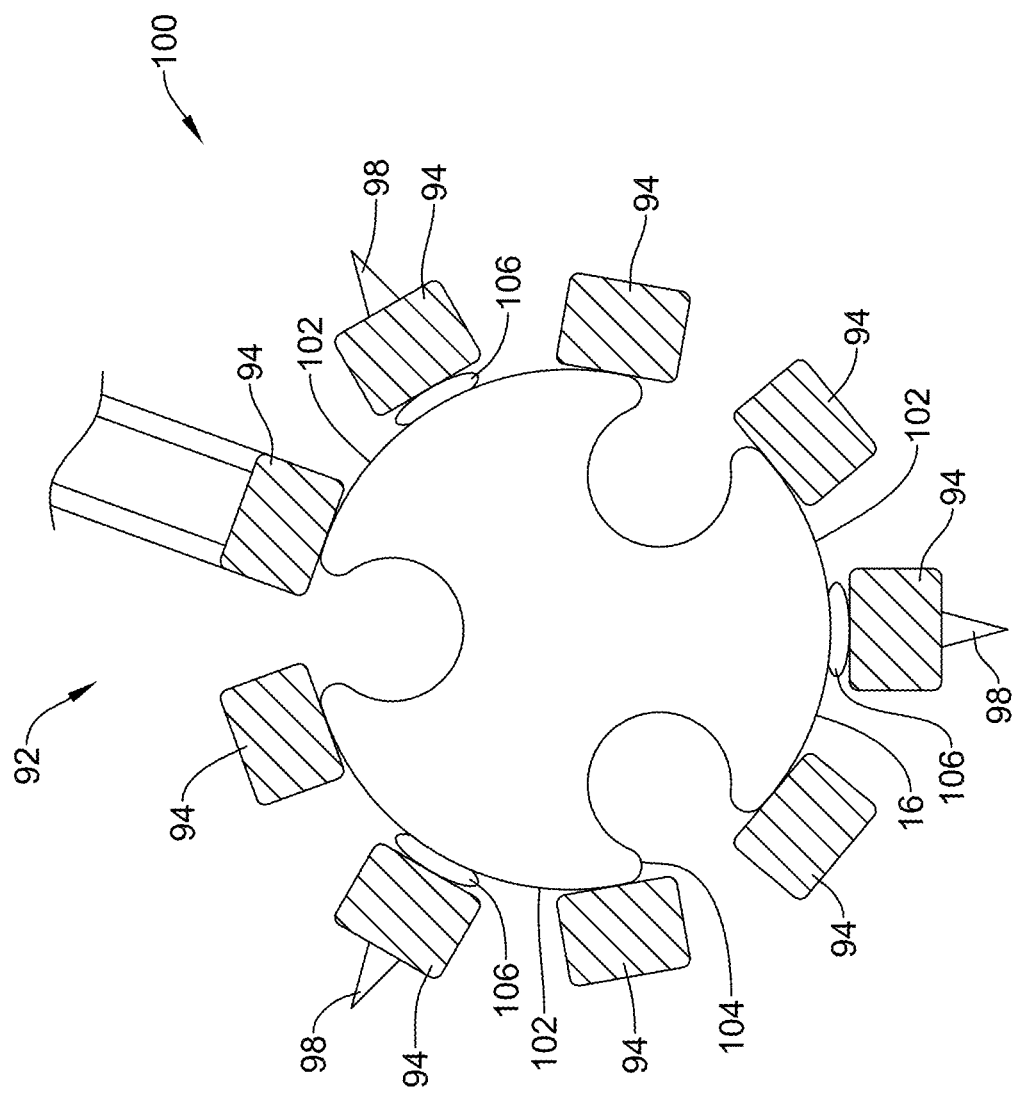
FIG. 10C is a cross-sectional view taken along the line 10c-10c of FIG. 10B.

FIG. 10C is a cross-sectional view of the medical device 100, taken along the line 10c-10c of FIG. 10B. The inflatable balloon 16 may be seen in its deflated configuration, with several wings 102. The first stent-like structure 94 may be seen in cross-section, with at least some portions of the first stent-like structure 94 bonded to an outer surface 104 of the inflatable balloon 16. In some instances, portions of the first stent-like structure 94 may be bonded to the outer surface 104 of the inflatable balloon 16 via adhesive pads 106. Any suitable medical-grade adhesive may be used, for example. A plurality of pads 106 may be spaced apart circumferentially around the inflatable balloon 16 securing discrete portions of the first stent-like structure 94 to the inflatable balloon 16 while leaving circumferential portions of the inflatable balloon 16 positioned circumferentially between adjacent pads 106 unattached to the stent-like structure 94. Thus, the unattached portions of the inflatable balloon 16 may fold inward away from the stent-like structure 94 in a deflated state, and may move radially outward against an inner surface of the stent-like structure 94 in an inflated state. Because the medical device 100 exposes the blades 98, even in its collapsed configuration, it may be useful to include a protective sheath or sleeve.

Figure 10D:
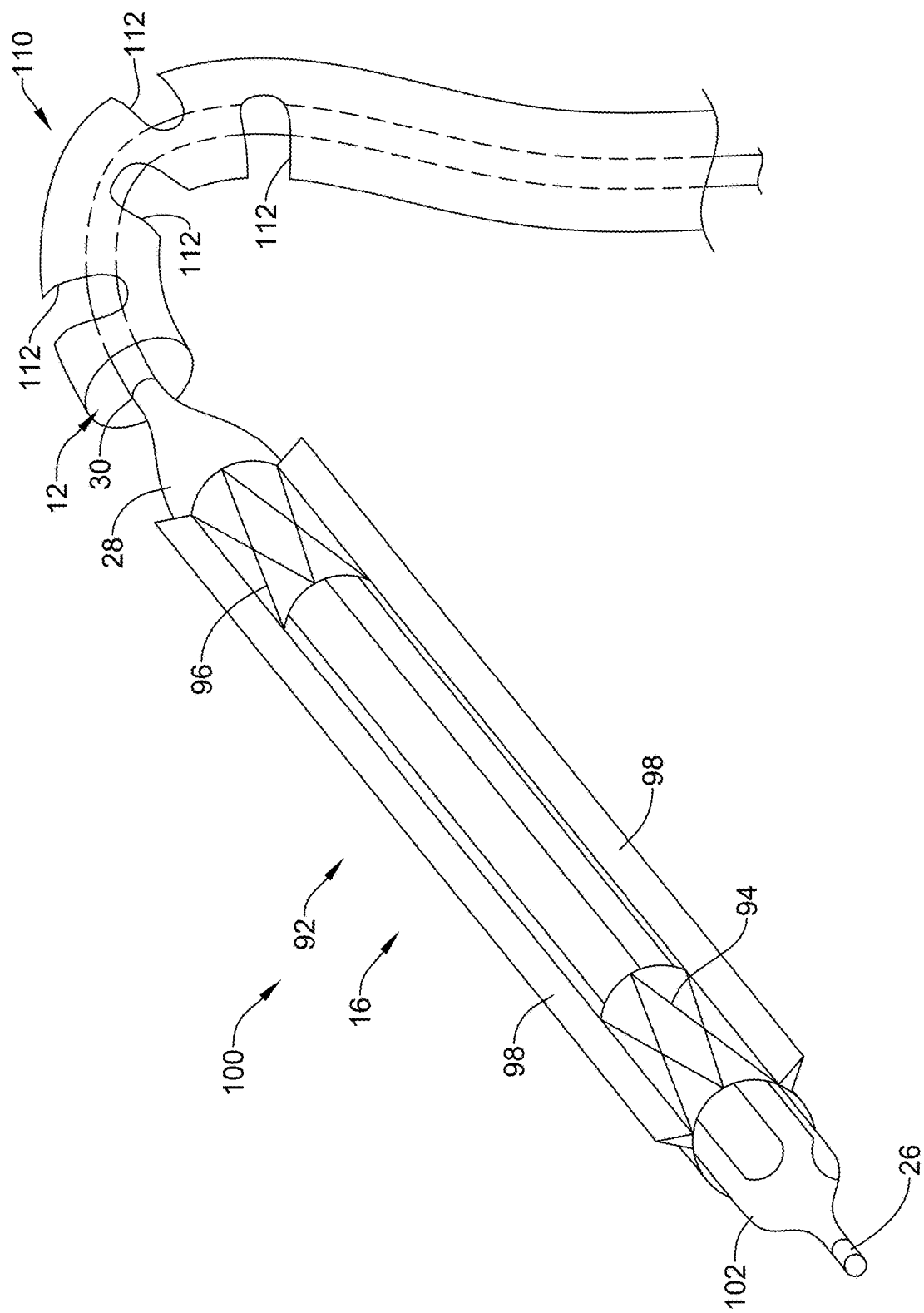
FIG. 10D is a perspective view of the example medical device of FIG. 10B, including a protective sheath.

FIG. 10D shows the medical device 100 with a protective sheath 110 that may be used to cover the exposed blades 98 while the medical device 100 is being advanced through the vasculature. Once a desired treatment area is reached, the protective sheath 110 may be withdrawn proximally to expose the blades 98. After the protective sheath 110 has been withdrawn, the inflatable balloon 16 may be inflated to urge the blade assembly 92 into contact with one or more lesions in the treatment area. In some instances, the protective sheath 110 may include cutouts 112 that improve the flexibility of the protective sheath 110. The protective sheath 110 may be formed of any of the polymeric materials frequently used in making medical devices, including for example any of the polymeric materials contemplated for the elongate shaft 12.

Figure 11A:
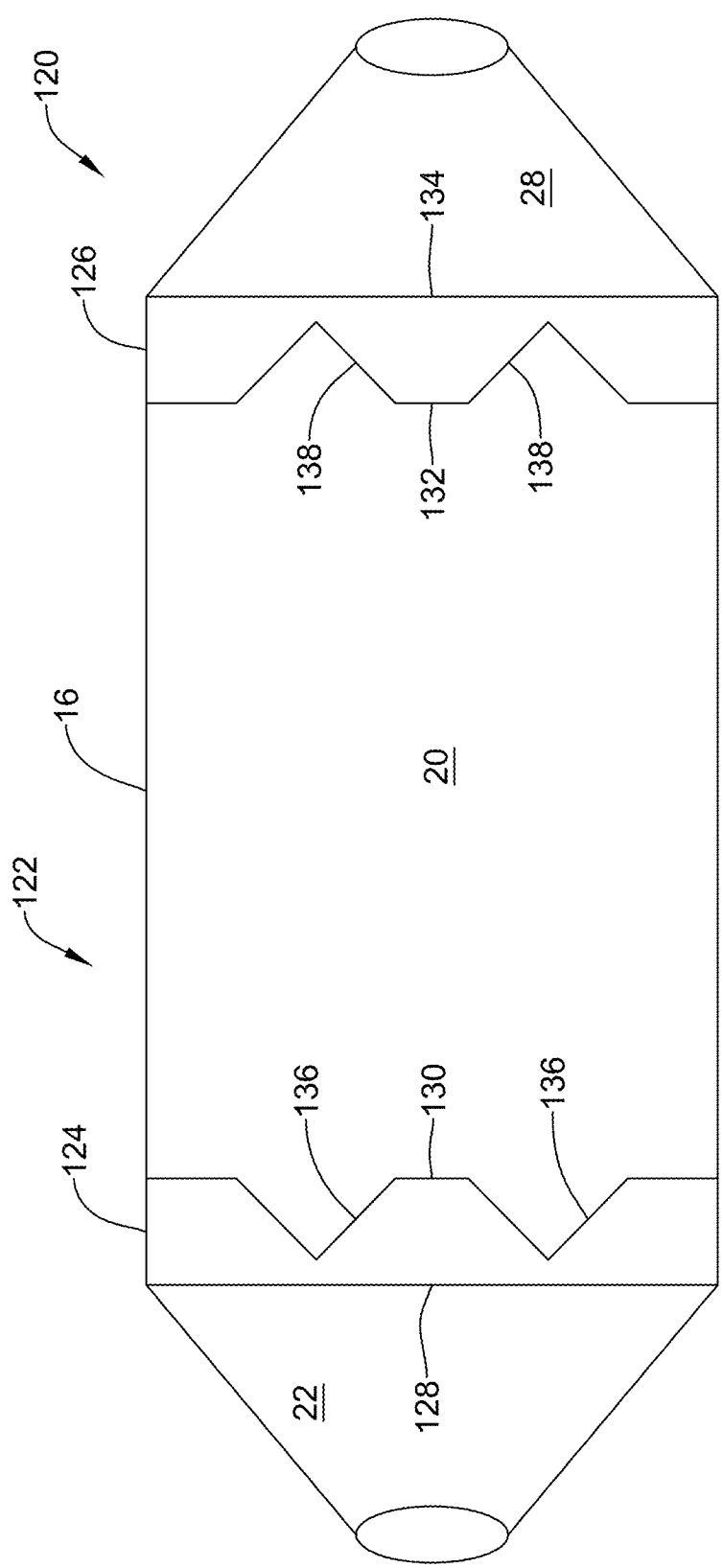
FIG. 11A is a schematic view of an example medical device in an expanded configuration.

FIG. 11A is a schematic view of an example medical device 120 that includes a blade assembly 122 disposed over the inflatable balloon 16, with the medical device 120 shown in an expanded configuration. For clarity, no blades are shown in FIG. 11A, but it will be appreciated that the blade assembly 122 may include any number of blades, such as the other blade assemblies 18, 48, 60, 80 and 92 described herein. The blade assembly 122 may include a distal ring 124 and a proximal ring 126. The distal ring 124 has a distal surface 128 and a proximal surface 130. The proximal ring 126 has a distal surface 132 and a proximal surface 134. The distal ring 124 includes several living hinges 136 that are formed within the proximal surface 130. The proximal ring 126 includes several living hinges 138 that are formed within the distal surface 132.

Figure 11B:
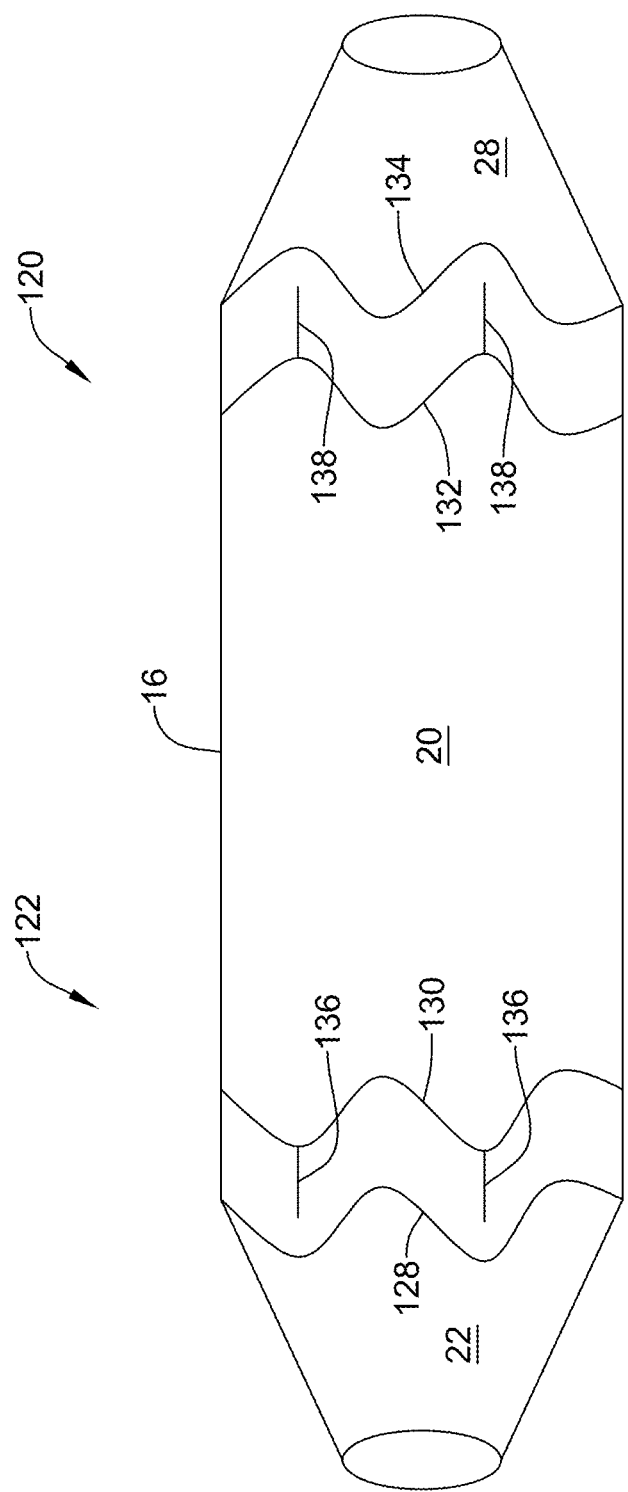
FIG. 11B is a schematic view of the example medical device of FIG. 11A shown in a collapsed configuration.

In viewing FIG. 11B, which represents a collapsed configuration, it can be seen that the distal ring 124 has become smaller in diameter, and the living hinges 136 have closed, bringing portions of the living hinges 136 closer to one another, as portions of the distal ring 124 move distally over the distal cone 22 of the inflatable balloon 16. The proximal ring 126 has become smaller in diameter, and the living hinges 138 have closed, bringing portions of the living hinges 138 closer to one another, as portions of the proximal ring 126 move proximally over the proximal cone 28 of the inflatable balloon 16. The inflatable balloon 16 has a reduced diameter in FIG. 11B when compared with FIG. 11A. It will be appreciated that FIGS. 11A and 11B show living hinges 136 and 138 that cause movement of the living hinges 136, 138 distally and proximally, respectively, rather than radially, when moving between expanded and collapsed configurations. In other words, the living hinges 136 in the distal ring 124 may move distally over the distal cone 22 of the inflatable balloon 16 as the inflatable balloon 16 is deflated and the distal ring 124 is reduced in diameter. Likewise, the living hinges 138 in the proximal ring 126 may move proximally over the proximal cone 28 of the inflatable balloon 16 as the inflatable balloon 16 is deflated and the proximal ring 126 is reduced in diameter.

Figure 12:
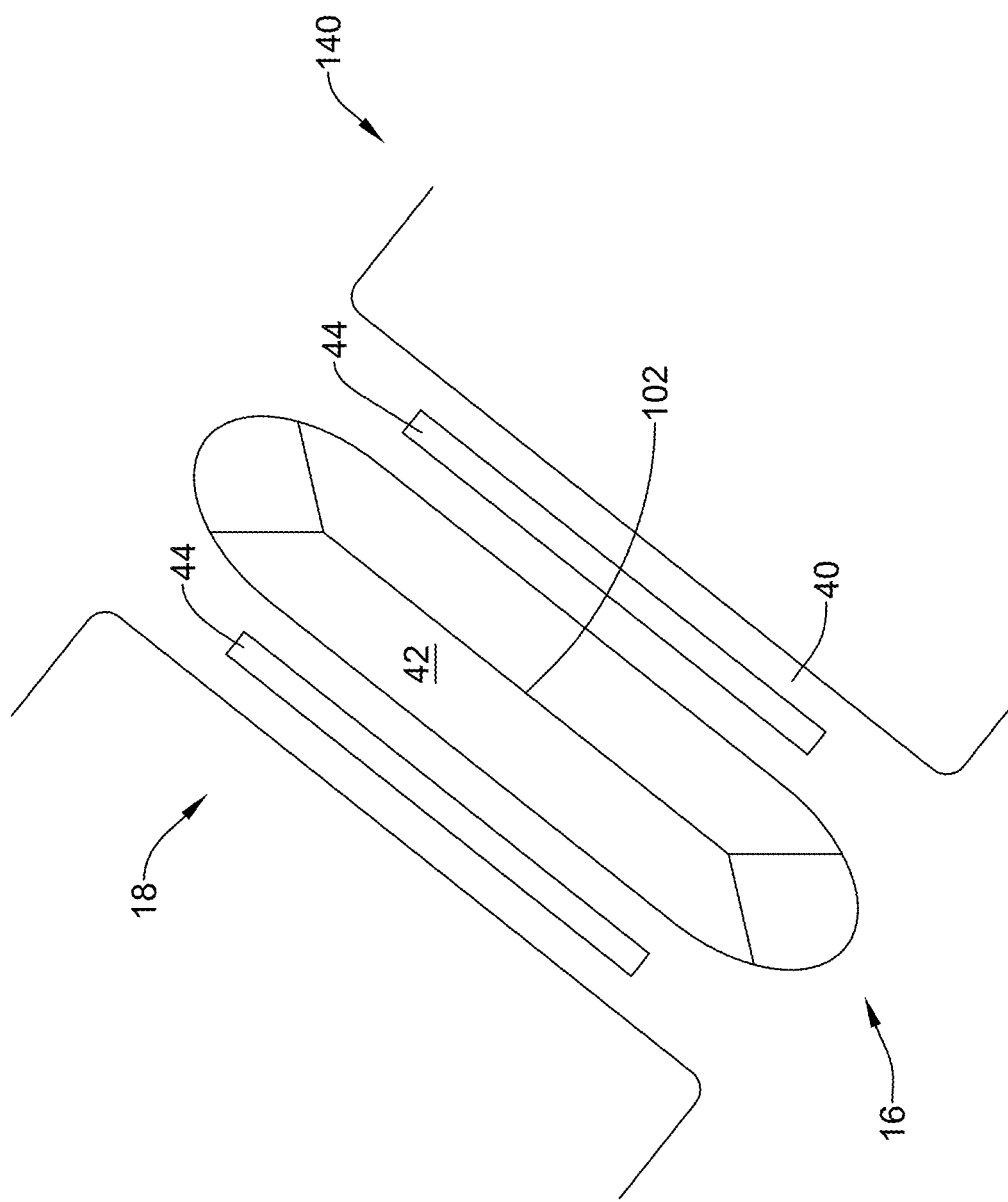
FIG. 12 is a schematic view of a portion of an example medical device.

FIG. 12 is a schematic view of a portion of an example medical device 140. The example medical device 140 may be considered as being an example of the medical device 10. The medical device 140 includes the blade assembly 18 mounted over the inflatable balloon 16. In some instances, the inflatable balloon 16 may include wings 102 when deflated and folded into its collapsed configuration. In some instances, one of the wings 102 may extend through one of the elongate void spaces 42 that are formed between adjacent elongate members 40. In some instances, multiple wings 102 may extend at least partially through the elongate void spaces 42.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A medical device, comprising:
a catheter shaft including a distal region;
an inflatable balloon secured to the distal region of the catheter shaft, the inflatable balloon including an outer surface; and
a blade assembly extending over and secured to at least part of the outer surface, the blade assembly comprising:
a plurality of blades;
at least two rings adapted to secure each of the plurality of blades, each of the at least two rings moveable between an expanded configuration in which each of the at least two rings have an annular profile and a collapsed configuration in which each of the at least two rings collapse radially inwardly, each of the at least two rings including:
an inner surface adapted to be secured relative to the outer surface of the inflatable balloon;
an outer surface opposite the inner surface;
a plurality of living hinges formed within the inner surface; and
a plurality of living hinges formed within the outer surface; and
wherein the plurality of living hinges formed within the inner surface and the plurality of living hinges formed within the outer surface cooperate to allow each of the plurality of blades to move radially inwardly in the collapsed configuration.

2. The medical device of claim 1, wherein for each of the plurality of blades:
the plurality of living hinges formed within the outer surface include a first pair of living hinges closest to that blade; and
the plurality of living hinges formed within the inner surface include a second pair of living hinges disposed adjacent and on either side of the first pair of living hinges.

3. The medical device of claim 1, wherein the blade assembly further comprises an elutable drug coating disposed on the blade assembly.

4. The medical device of claim 1, wherein the blade assembly further comprises a plurality of elongate members extending axially between a first ring of the at least two rings and a second ring of the at least two rings, the first ring, the second ring and the plurality of elongate members forming a cage that is adapted to be secured in place over the inflatable balloon.

5. The medical device of claim 4, wherein each of the plurality of blades are attached to one of the plurality of elongate members.

6. The medical device of claim 4, wherein the plurality of elongate members define a plurality of elongate void spaces between adjacent elongate members.

7. The medical device of claim 6, wherein the inflatable balloon defines one or more balloon wings when the inflatable balloon is deflated, and the one or more balloon wings are adapted to extend through one or more of the plurality of elongate void spaces.

8. The medical device of claim 1, wherein each of the at least two rings include slots formed in the outer surface thereof to allow each of the plurality of blades to be disposed in the slots.

9. The medical device of claim 8, wherein the slots formed in a first ring of the at least two rings are radially aligned with the slots formed in a second ring of the at least two rings.

10. The medical device of claim 1, wherein the plurality of blades comprises more than four blades.

11. The medical device of claim 1, wherein the plurality of blades comprises eight blades.

12. A medical device, comprising:
a catheter shaft including a distal region;

an inflatable balloon secured to the distal region of the catheter shaft, the inflatable balloon including an outer surface including a distal cone and a proximal cone; and a blade assembly extending over and secured to at least part of the outer surface, the blade assembly comprising:
- one or more blades;
- a distal ring and a proximal ring moveable between an expanded configuration and a collapsed configuration and adapted to secure each of the one or more blades;
- the distal ring including:
  - an inner surface adapted to be secured relative to the outer surface of the inflatable balloon; and
  - a plurality of living hinges formed within the distal ring and adapted to extend over the distal cone in the collapsed configuration; and
- the proximal ring including:
  - an inner surface adapted to be secured relative to the outer surface of the inflatable balloon; and
  - a plurality of living hinges formed within the proximal ring and adapted to extend over the proximal cone in the collapsed configuration.

13. The medical device of claim 12, wherein the blade assembly further comprises a plurality of elongate members extending axially between a distal ring and the proximal ring, the proximal ring, the distal ring and the plurality of elongate members forming a cage that is adapted to be secured in place over the inflatable balloon.

14. The medical device of claim 13, wherein the plurality of elongate members define a plurality of elongate void spaces between adjacent elongate members.

15. The medical device of claim 14, wherein the inflatable balloon defines one or more balloon wings when the inflatable balloon is deflated, and the one or more balloon wings are adapted to extend through one or more of the plurality of elongate void spaces.

16. The medical device of claim 12, wherein the distal ring, the proximal ring, the plurality of elongate members and the plurality of blades are all formed of the same material.

17. The medical device of claim 12, wherein the blade assembly further comprises an elutable drug coating disposed on the blade assembly.

18. A medical device, comprising:
a catheter shaft including a distal region;
an inflatable balloon secured to the distal region of the catheter shaft, the inflatable balloon including an outer balloon surface; and
a blade assembly extending over and secured to at least part of the outer balloon surface, the blade assembly moveable between an expanded configuration and a collapsed configuration, the blade assembly comprising:
- a first annular band comprising:
  - an inner surface adapted to be secured relative to the outer balloon surface;
  - a plurality of inner hinges formed in the inner surface;
  - an outer surface opposite the inner surface;
  - a plurality of outer hinges formed in the outer surface;
  - a channel formed in the outer surface;
- a second annular band comprising:
  - an inner surface adapted to be secured relative to the outer balloon surface;
  - a plurality of inner hinges formed in the inner surface;
  - an outer surface opposite the inner surface;
  - a plurality of outer hinges formed in the outer surface;
  - a channel formed within the outer surface, where the channel formed within the outer surface of the second annular band is aligned with the channel formed within the outer surface of the first annular band; and
- a blade disposed within the channel formed within the first annular band and the channel formed within the second annular band.

19. The medical device of claim 18, wherein the first annular band and the second annular band comprise an elastomeric material or a shape memory material.

20. The medical device of claim 18, wherein the channel formed within the first annular band and the channel formed within the second annular band are each adapted to secure the blade in place.

* * * * *